United States Patent
Rittberg et al.

(10) Patent No.: US 11,143,747 B2
(45) Date of Patent: Oct. 12, 2021

(54) METHODS AND SYSTEMS FOR CLASSIFYING RECEIVED SIGNALS FROM RADAR SYSTEM

(71) Applicant: GM GLOBAL TECHNOLOGY OPERATIONS LLC, Detroit, MI (US)

(72) Inventors: Eyal Rittberg, Petach Tikva (IL); Boris Indelman, Rannana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 315 days.

(21) Appl. No.: 16/508,701

(22) Filed: Jul. 11, 2019

(65) Prior Publication Data
US 2021/0011124 A1 Jan. 14, 2021

(51) Int. Cl.
*G01S 7/41* (2006.01)
*G01S 13/89* (2006.01)
*G01S 13/931* (2020.01)

(52) U.S. Cl.
CPC .............. *G01S 7/414* (2013.01); *G01S 13/89* (2013.01); *G01S 13/931* (2013.01)

(58) Field of Classification Search
CPC ...... G01S 7/354; G01S 7/414; G01S 13/5244; G01S 13/534; G01S 13/89; G01S 13/931; G01S 13/95
See application file for complete search history.

(56) References Cited

U.S. PATENT DOCUMENTS

| | | | | |
|---|---|---|---|---|
| 4,450,446 A | * | 5/1984 | Clancy | G01S 13/5244 342/159 |
| 4,680,588 A | * | 7/1987 | Cantwell | H03G 3/3052 342/92 |
| 4,742,353 A | * | 5/1988 | D'Addio | G01S 13/5244 342/159 |
| 5,465,095 A | * | 11/1995 | Bryant | G01S 13/5244 342/159 |
| 5,539,412 A | * | 7/1996 | Mendelson | G01S 13/5244 342/192 |
| 5,760,734 A | * | 6/1998 | Urkowitz | G01S 7/414 342/159 |
| 6,252,540 B1 | * | 6/2001 | Hale | G01S 7/2921 342/159 |
| 6,822,606 B2 | * | 11/2004 | Ponsford | G01S 3/74 342/192 |

(Continued)

*Primary Examiner* — Peter M Bythrow
(74) *Attorney, Agent, or Firm* — Lorenz & Kopf LLP

(57) ABSTRACT

A system for classifying received signals from a radar system into noise or a detection includes a source of a radar energy map and a memory that stores an integral image data structure for computing an integral image. The system includes a processor in communication with the source and the memory programmed to: generate an initial image including initial cells each having an energy value based on the radar energy map; compute the integral image based on the initial image; determine a coordinate location of an initial cell; determine coordinate locations of indices associated with corners of a neighborhood surrounding the initial cell; determine an energy sum of the neighborhood based on the indices and a value of respective cells from the integral image; determine an estimated noise associated with the initial cell based on the energy sum; and determine whether the initial cell indicates the detection of an object.

20 Claims, 21 Drawing Sheets

(56) References Cited

U.S. PATENT DOCUMENTS

| | | | |
|---|---|---|---|
| 6,937,185 B1* | 8/2005 | Collazo | G01S 13/5244 342/159 |
| 9,594,159 B2* | 3/2017 | Wang | G01S 7/414 |
| 9,971,027 B1* | 5/2018 | Stockmann | G01S 13/5244 |
| 10,042,040 B2* | 8/2018 | Kobori | G01S 13/343 |
| 10,852,419 B2* | 12/2020 | Zhong | G06K 9/00208 |
| 2003/0174088 A1* | 9/2003 | Dizaji | G01S 13/0209 342/93 |
| 2004/0046689 A1* | 3/2004 | Rees | G01S 13/5244 342/159 |
| 2004/0178951 A1* | 9/2004 | Ponsford | G01S 3/74 342/192 |
| 2007/0139258 A1* | 6/2007 | Tsai | G01S 7/2922 342/159 |
| 2010/0073218 A1* | 3/2010 | Stockmann | G01S 7/2923 342/146 |
| 2012/0139777 A1* | 6/2012 | Hunter | G01S 13/5244 342/175 |
| 2013/0201054 A1* | 8/2013 | Wang | G01S 13/04 342/93 |
| 2014/0176361 A1* | 6/2014 | Dizaji | G01S 7/2922 342/93 |
| 2014/0333475 A1* | 11/2014 | Sierwald | G01S 13/951 342/26 R |
| 2015/0331098 A1* | 11/2015 | Luebbert | G01S 13/34 342/91 |
| 2016/0018511 A1* | 1/2016 | Nayyar | G01S 13/87 342/27 |
| 2017/0003378 A1* | 1/2017 | Neumann | G01S 13/66 |
| 2017/0010344 A1* | 1/2017 | Corbett | G01S 7/023 |
| 2017/0097406 A1* | 4/2017 | Kobori | G01S 7/354 |
| 2017/0102458 A1* | 4/2017 | Schuman | G01S 7/288 |
| 2018/0164421 A1* | 6/2018 | Brown | G01S 13/931 |
| 2018/0275259 A1* | 9/2018 | Ott | G01S 13/5246 |
| 2019/0011548 A1* | 1/2019 | Han | G01S 13/64 |
| 2020/0103523 A1* | 4/2020 | Liu | G01S 13/931 |
| 2020/0174096 A1* | 6/2020 | Cho | G01S 13/931 |

* cited by examiner

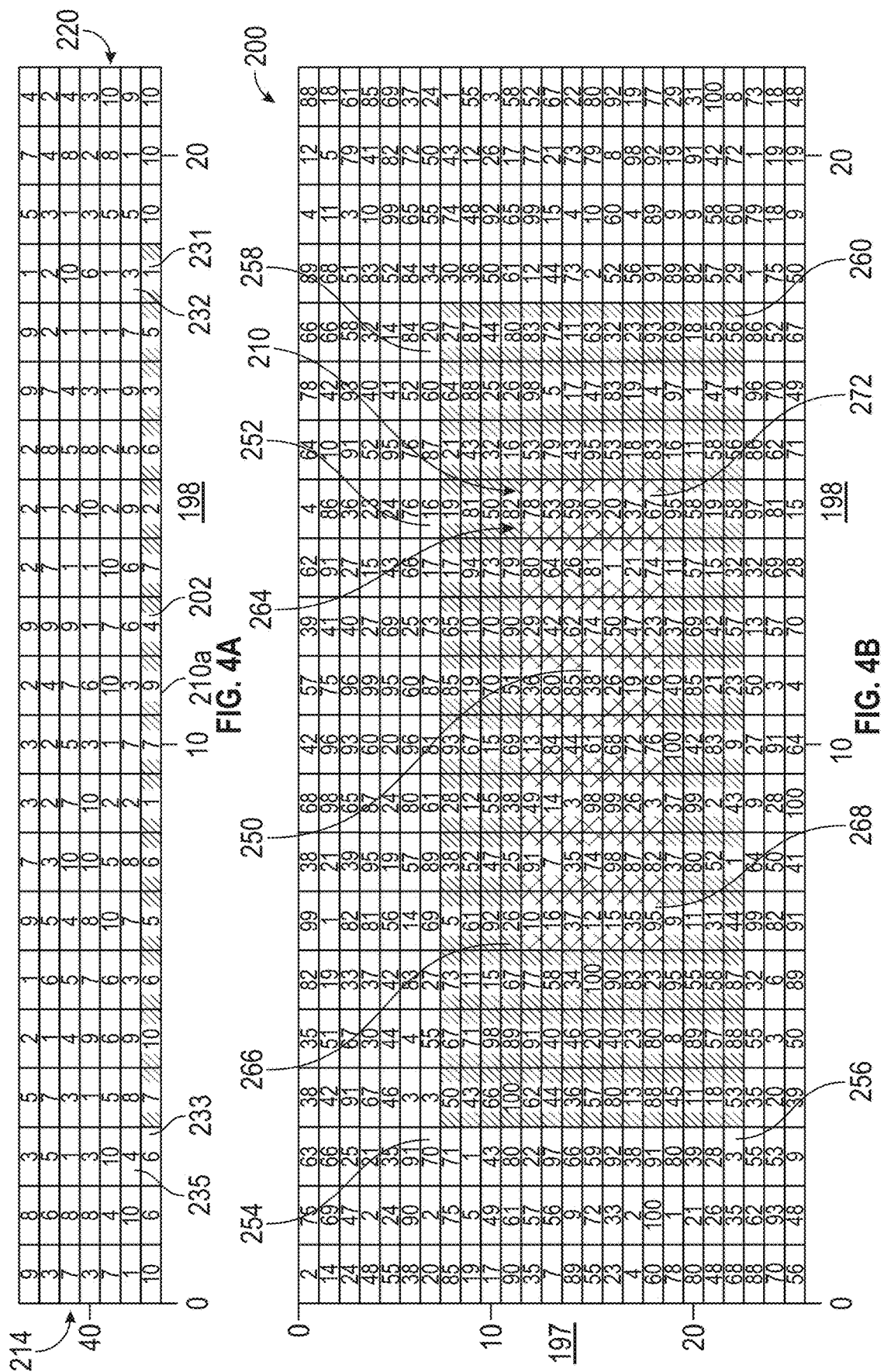

METHODS AND SYSTEMS FOR CLASSIFYING RECEIVED SIGNALS FROM RADAR SYSTEM

INTRODUCTION

The technical field generally relates to methods and systems for controlling a vehicle, and more particularly relates to methods and systems for classifying received signals from a radar system associated with the vehicle into noise or a detection for controlling the vehicle.

Autonomous and semi-autonomous vehicles may rely on sensors, such as radar systems, to control a movement of the vehicle or to warn of an object in proximity to the vehicle. Generally, in order to ensure that the radar system has detected an object, the data received by a radar detector is analyzed to determine whether an object is detected or if the data contains noise. Typically, in order to analyze the data, numerous computations are required in order to determine whether each cell in the data contains noise or indicates a detection. Due to the number of calculations involved, current radar systems may be limited in the number of detections that may be processed, which may lead to missed detections.

Accordingly, it is desirable to provide improved methods and systems for classifying received signals from a radar system associated with the vehicle into noise or a detection for controlling the vehicle. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a system for classifying received signals from a radar system into noise or a detection. The system includes a source of a radar energy map that contains the received signals and a memory that stores an integral image data structure for computing an integral image having a plurality of cells with a coordinate location. The system includes a processor in communication with the source and the memory, the processor programmed to: generate an initial image including a plurality of initial cells each having an energy value and a coordinate location based on the radar energy map; compute the integral image based on the initial image, with each cell of the plurality of cells of the integral image containing a value computed based on the energy values of associated cells of the plurality of initial cells of the initial image, and store the computed integral image in the integral image data structure; determine, based on the initial image, a coordinate location of an initial cell of the plurality of initial cells; determine coordinate locations of indices associated with corners of a neighborhood surrounding the initial cell based on the coordinate location of the initial cell and a neighborhood threshold for the number of initial cells associated with the neighborhood; determine an energy sum of the neighborhood based on the coordinate locations of the indices and the value of respective cells of the plurality of cells from the integral image associated with the coordinate locations of the indices; determine an estimated noise associated with the initial cell based on the energy sum; and determine, based on the estimated noise and the energy value of the initial cell from the initial image, whether the initial cell indicates the detection of an object.

The processor is further programmed to determine whether to wrap the neighborhood around the initial image based on the coordinate location of the initial cell and the neighborhood threshold. Based on the determination to wrap the neighborhood around the initial image, the processor is further programmed to break the neighborhood into additional portions to reach the neighborhood threshold for the number of initial cells associated with the neighborhood and to determine the indices of the neighborhood based on indices associated with corners of each portion. The processor is further programmed to construct a guard surrounding the initial cell within the neighborhood based on the coordinate location of the initial cell in the initial image and a guard threshold for a number of initial cells associated with the guard, and to determine guard indices based on the guard. The processor is further programmed to determine whether to wrap the guard around the initial image based on the coordinate location of the initial cell and the guard threshold for the number of initial cells associated with the guard. Based on the determination to wrap the guard around the initial image, the processor is further programmed to break the guard into additional guard portions to reach the guard threshold for the number of initial cells associated with the guard and to determine the guard indices based on guard indices associated with corners of each guard portion. The processor is programmed to determine a guard energy sum of the guard based on the coordinate locations of the guard indices and the value of respective cells of the plurality of cells from the integral image associated with the coordinate locations of the guard indices. The processor is further programmed to determine a total energy sum associated with the initial cell based on the energy sum and the guard energy sum, and the processor is programmed to determine the estimated noise based on the total energy sum.

According to various embodiments, also provided is a method for classifying received signals from a radar system into noise or a detection. The method includes providing a memory that stores an integral image data structure for computing an integral image having a plurality of cells; receiving, by a processor, a radar energy map that contains the received signals from a source; generating, by the processor, an initial image having a plurality of initial cells that each contain an energy value and a coordinate location based on the radar energy map; computing, by the processor, the integral image based on the initial image, with each cell of the plurality of cells of the integral image containing a value computed based on the energy values of associated cells of the plurality of initial cells of the initial image, and storing the computed integral image in the integral image data structure; determining, by the processor, based on the initial image, a coordinate location of an initial cell of the plurality of initial cells that has the energy value that is greater than a threshold; determining, by the processor, coordinate locations of indices associated with corners of a neighborhood surrounding the initial cell based on the coordinate location of the initial cell and a neighborhood threshold for the number of initial cells associated with the neighborhood; determining, by the processor, an energy sum of the neighborhood based on the coordinate locations of the indices and the value of the respective cells of the plurality of cells from the integral image associated with the coordinate locations of the indices; determining, by the processor, an estimated noise associated with the initial cell based on the energy sum; and determining, by the processor, based on the estimated noise and the energy value of the initial cell from the initial image, whether the initial cell indicates the detection of an object.

The method further includes determining, by the processor, to wrap the neighborhood around the initial image based on the coordinate location of the initial cell and the neighborhood threshold; breaking, by the processor, the neighborhood into additional portions to reach the neighborhood threshold for the number of initial cells associated with the neighborhood; and determining, by the processor, the indices of the neighborhood based on the indices associated with corners of each portion. The method further includes constructing, by the processor, a guard surrounding the initial cell within the neighborhood based on the coordinate location of the initial cell in the initial image and a guard threshold for a number of initial cells associated with the guard; and determining, by the processor, guard indices based on the guard, the guard indices associated with corners of the guard. The method further includes determining, by the processor, to wrap the guard around the initial image based on the coordinate location of the initial cell and the guard threshold for the number of initial cells associated with the guard; breaking, by the processor, the guard into additional guard portions to reach the threshold for the number of initial cells associated with the guard; and determining, by the processor, the guard indices based on the indices associated with corners of each guard portion. The method further includes determining, by the processor, a guard energy sum of the guard based on the coordinate locations of the guard indices and the value of respective cells of the plurality of cells from the integral image associated with the coordinate locations of the guard indices. The method further includes determining, by the processor, a total energy sum associated with the initial cell based on the energy sum and the guard energy sum; and determining, by the processor, the estimated noise based on the total energy sum.

According to various embodiments, further provided is a vehicle. The vehicle includes a source of a radar energy map and a memory that stores an integral image data structure for computing an integral image having a plurality of cells. The vehicle includes a processor in communication with the source and the memory, the processor programmed to: generate an initial image including a plurality of initial cells each having an energy value and a coordinate location based on the radar energy map; compute the integral image based on the initial image, with each cell of the plurality of cells of the integral image containing a value computed based on the energy values of associated cells of the plurality of initial cells of the initial image, and store the computed integral image in the integral image data structure; determine, based on the initial image, a coordinate location of an initial cell of the plurality of initial cells that has the energy value that is greater than a threshold; determine coordinate locations of indices associated with corners of a neighborhood surrounding the initial cell based on the coordinate location of the initial cell and a neighborhood threshold for the number of initial cells associated with the neighborhood; determine an energy sum of the neighborhood based on the coordinate locations of the indices and the value of respective cells of the plurality of cells from the integral image associated with the coordinate locations of the indices; determine coordinate locations of guard indices associated with corners of a guard surrounding the initial cell based on the coordinate location of the initial cell and a guard threshold for the number of initial cells associated with the guard; determine a guard energy sum of the guard based on the coordinate locations of the guard indices and the value of respective cells of the plurality of cells from the integral image associated with the coordinate locations of the guard indices; determine an estimated noise associated with the initial cell based on the energy sum and the guard energy sum; and determine, based on the estimated noise and the energy value of the initial cell from the initial image, whether the initial cell indicates the detection of an object.

The processor is further programmed to determine whether to wrap the neighborhood around the initial image based on the coordinate location of the initial cell and the neighborhood threshold. Based on the determination to wrap the neighborhood around the initial image, the processor is further programmed to break the neighborhood into additional portions to reach the neighborhood threshold for the number of initial cells associated with the neighborhood and to determine the indices of the neighborhood based on indices associated with corners of each portion. The processor is further programmed to determine whether to wrap the guard around the initial image based on the coordinate location of the initial cell and the guard threshold for the number of initial cells associated with the guard. Based on the determination to wrap the guard around the initial image, the processor is further programmed to break the guard into additional guard portions to reach the guard threshold for the number of initial cells associated with the guard and to determine the guard indices based on guard indices associated with corners of each guard portion. The processor is further programmed to control the vehicle based on the detection of the object.

BRIEF DESCRIPTION OF THE DRAWINGS

The exemplary embodiments will hereinafter be described in conjunction with the following drawing figures, wherein like numerals denote like elements, and wherein:

FIGS. 4 and 4A are an example of energy values of a portion of an initial image of range-doppler cells generated by a receiver of the radar system based on a radar energy map received by receiving antennas of the radar system associated with the autonomous vehicle in accordance with various embodiments, with FIG. 4A being a continuation of FIG. 4;

FIG. 4B is an example of energy values of a portion of an initial image of range-doppler cells generated by a receiver of the radar system based on a radar energy map received by receiving antennas of the radar system associated with the autonomous vehicle in accordance with various embodiments;

Figures 5A, 5B:
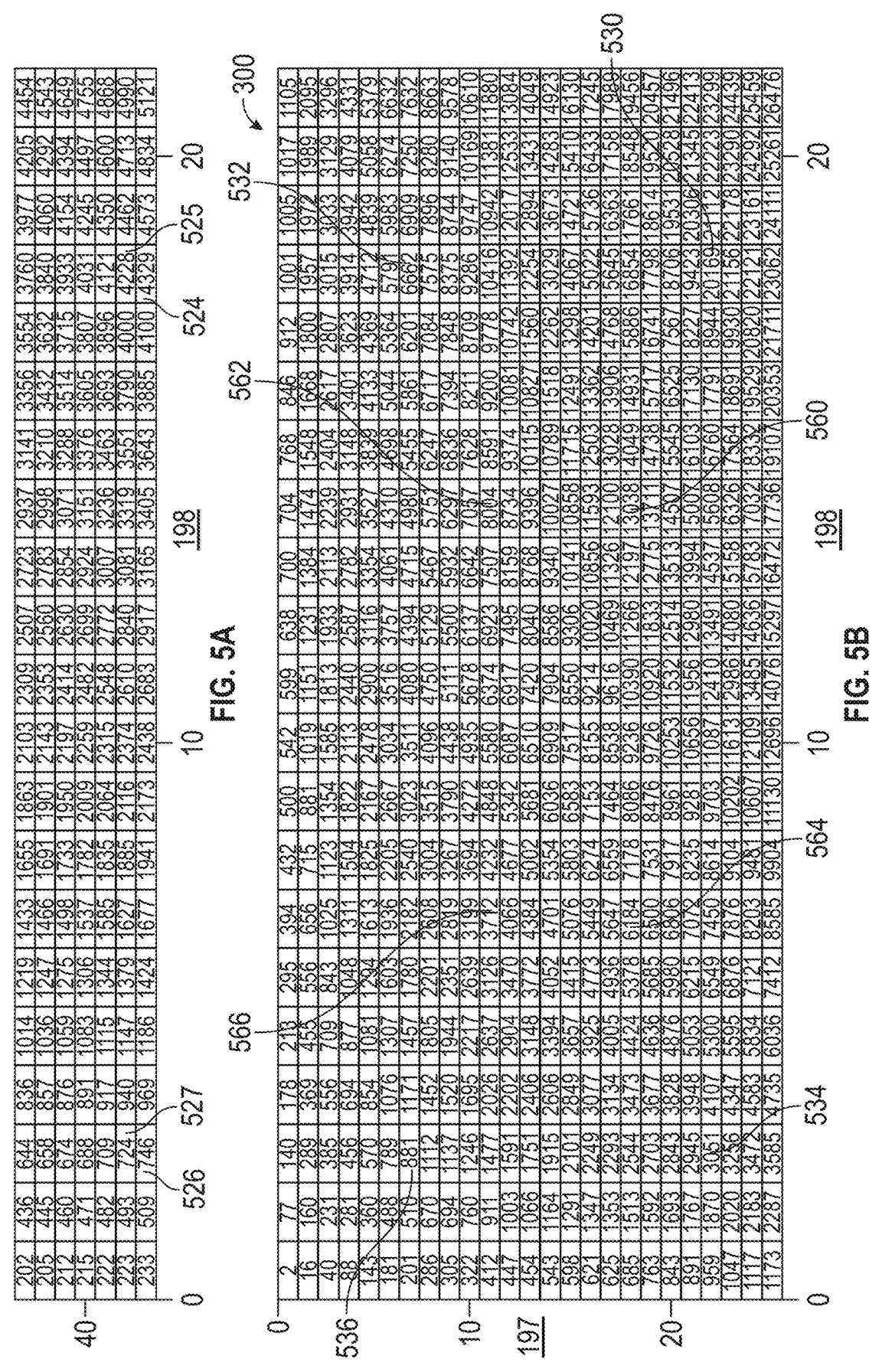

FIGS. 5 and 5A are an example of values associated with cells of an integral image generated by the classification and detection system based on the energy values of the range-doppler cells generated by the receiver of the radar in the portion of the initial image of FIGS. 4 and 4A in accordance with various embodiments, with FIG. 5A being a continuation of FIG. 5;

FIG. 5B is an example of values associated with cells of an integral image generated by the classification and detection system based on the energy values of the range-doppler cells generated by the receiver of the radar in the portion of the initial image of FIG. 4B in accordance with various embodiments;

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
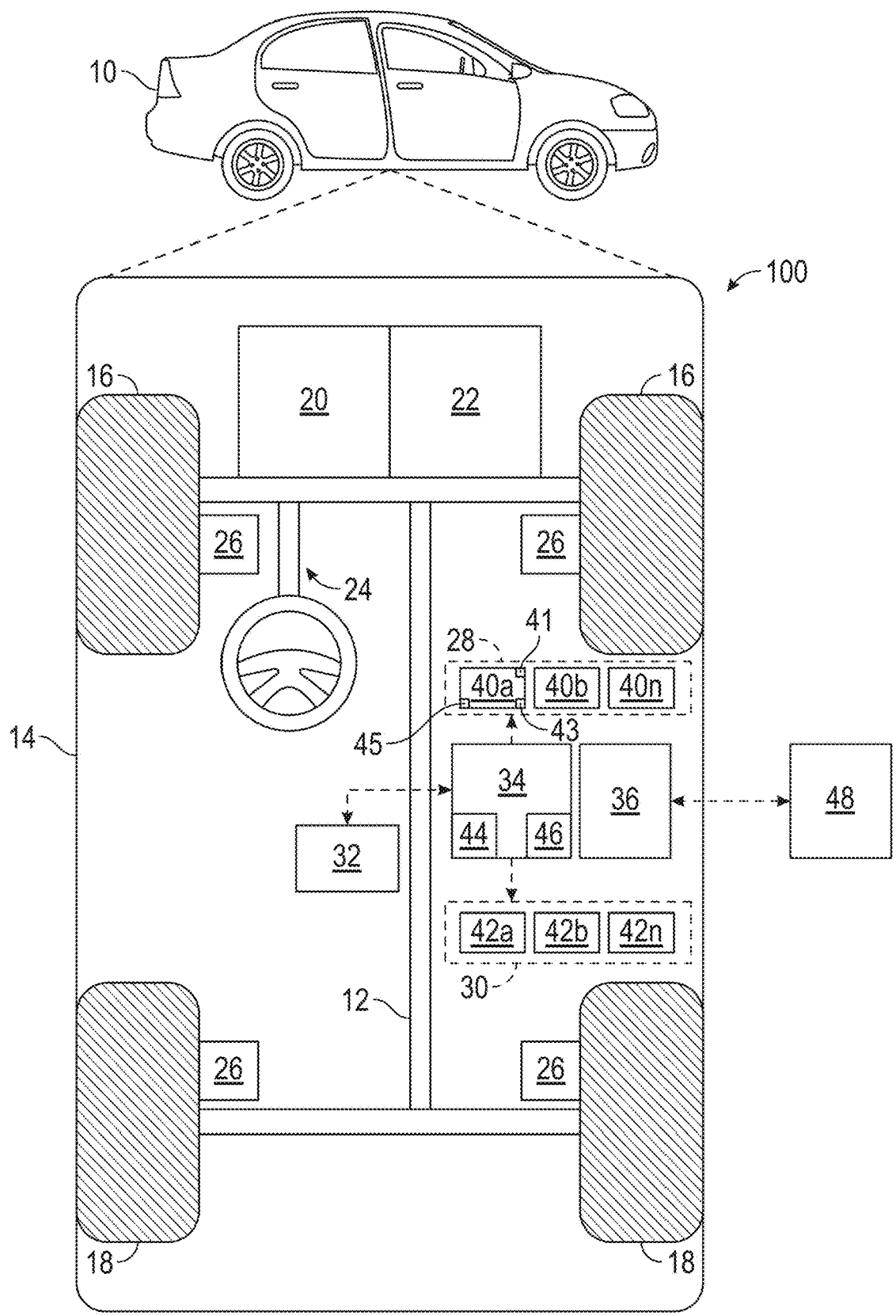
FIG. 1 is a functional block diagram illustrating an autonomous vehicle including a radar system having a classification and detection system, in accordance with various embodiments.

With reference to FIG. 1, a classification and detection system shown generally at 100 is associated with a vehicle 10 in accordance with various embodiments. In general, the classification and detection system 100 classifies received signals from a radar system 40a associated with the vehicle 10 into noise or detections in two-dimensions with a significant reduction in computations, which ensures that the data received by the radar system 40a is processed efficiently for intelligently controlling the vehicle 10 based thereon.

As depicted in FIG. 1, the autonomous vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the classification and detection system 100 is incorporated into the vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It should be noted that the classification and detection system 100 may also be employed with other lower-level automation systems. For example, the classification and detection system 100 may be used with a Level Two system to enable the output of a warning or notification upon the detection of an object in proximity to the vehicle.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, the radar system 40a, lidars, global positioning systems, optical cameras, thermal cameras, ultrasonic sensors, inertial measurement units, and/or other sensors. Generally, the radar system 40a includes a transceiver module 41, one or more transmitting antennas 43 and one or more receiving antennas 45. The transceiver module 41 is in communication with the transmitting antennas 43 and the receiving antennas 45. The transmitting antennas 43 radiate a radio frequency signal and the receiving antennas 45 detect any reflections from potential objects. The transceiver module 41 receives control signals from the controller 34 to radiate the radio frequency signal via the transmitting antennas 43, and transmits received signals from the receiving antennas 45 to the controller 34. As will be discussed, based on the received signals, the controller 34 determines whether an object has been detected or if the signal indicates noise. It should be noted that the position of the radar system 40a is merely exemplary, as the radar system 40a may be positioned at any desired location about the autonomous vehicle 10, and moreover, the autonomous vehicle 10 may include more than one radar system 40a.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
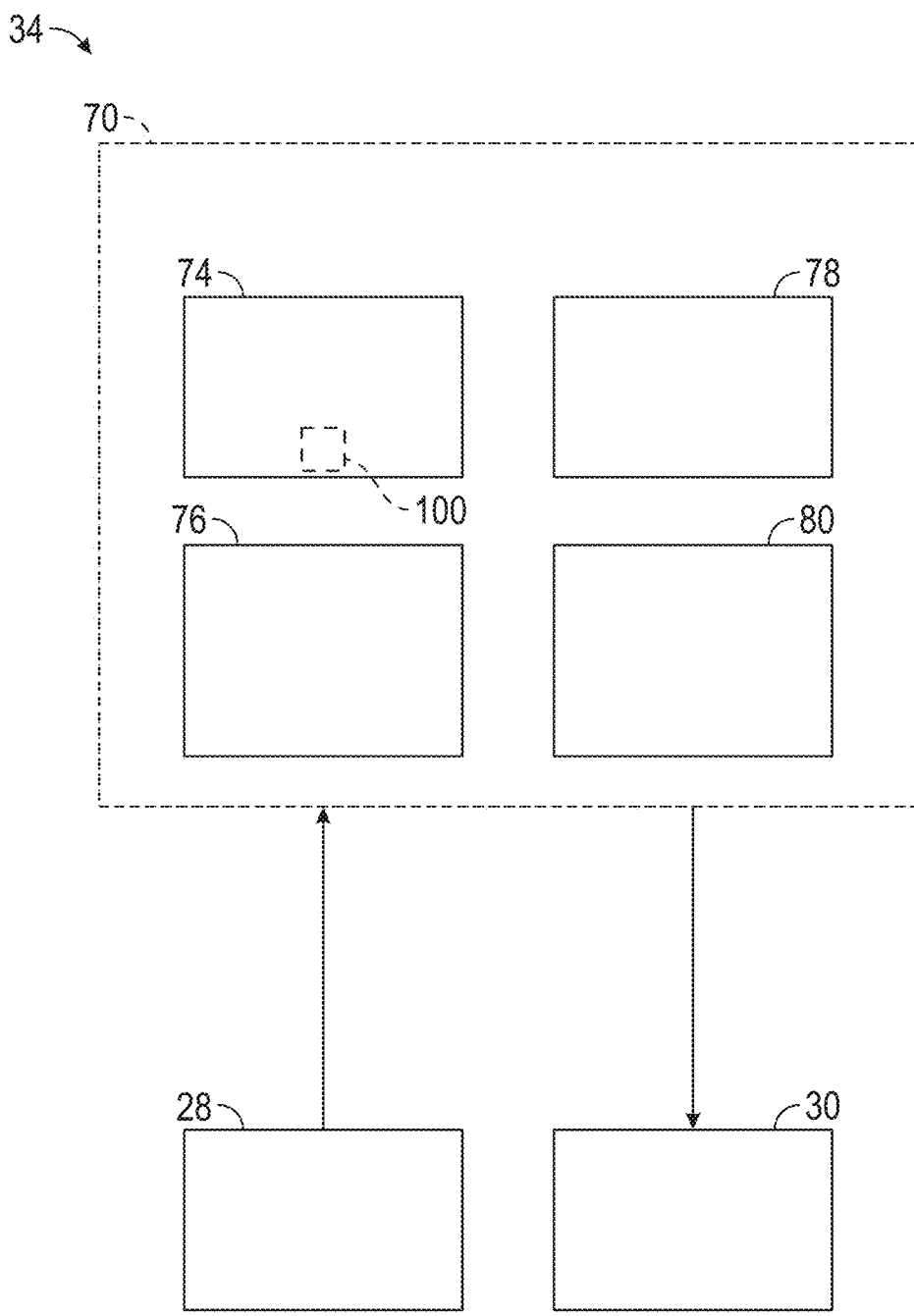
FIGS. 2 and 3 are dataflow diagrams illustrating an autonomous driving system that includes the classification and detection system of the autonomous vehicle, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the classification and detection system 100 and, when executed by the processor 44, determine whether the received signals from the receiving antenna 45 contain noise or a detection. Generally, the classification and detection system 100 may qualify the signals as noise or detection in substantially fewer computations by using an integral image data structure, as will be discussed further herein.

As can be appreciated, the subject matter disclosed herein provides certain enhanced features and functionality to what may be considered as a standard or baseline autonomous vehicle 10. To this end, an autonomous vehicle can be modified, enhanced, or otherwise supplemented to provide the additional features described in more detail below.

In accordance with various embodiments, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with the autonomous vehicle 10.

In various embodiments, the instructions of the autonomous driving system 70 may be organized by function, module, or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the autonomous vehicle 10. In various embodiments, the computer vision system 74 can incorporate information from multiple sensors, including but not limited to cameras, lidars, the radar system 40a, and/or any number of other types of sensors. It should be noted that in certain embodiments, the computer vision system 74 may also include a signal processing system, which processes the signals received from the multiple sensors, including but not limited to cameras, lidars, the radar system 40a, and/or any number of other types of sensors.

The positioning system 76 processes sensor data along with other data to determine a position (e.g., a local position relative to a map, an exact position relative to lane of a road, vehicle heading, velocity, etc.) of the autonomous vehicle 10 relative to the environment. The guidance system 78 processes sensor data along with other data to determine a path for the autonomous vehicle 10 to follow. The vehicle control system 80 generates control signals for controlling the autonomous vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the classification and detection system 100 of FIG. 1 is included within the autonomous driving system 70, and for example, is embedded within or associated with the computer vision system 74. In certain embodiments, the classification and detection system 100 may be embedded within or associated with the signal processing system. In this example, the classification and detection system 100 processes the signals received by the receiving antenna 45 (FIG. 1) in the sensor system 28 and determines whether the radar system 40a has detected an object or whether the signal received by the receiving antenna 45 contains noise. By processing the sensor data from the sensor system 28, in this example, the radar system 40a using the classification and detection system 100, the received signals may be efficiently processed in two dimensions, which provides improved detection accuracy with reduced computing time. Based on the detection of an object by the classification and detection system 100, the guidance system 78 may change a path of the autonomous vehicle 10 (to navigate around the object), or the vehicle control system 80 may generate control signals for controlling the autonomous vehicle 10 based on the detection of the object, including controlling the one or more actuators 49a-49n to actuate the brake system 26 (to slow or stop the autonomous vehicle 10); to control the steering system 24 (to steer around the object); etc.

Figure 3:
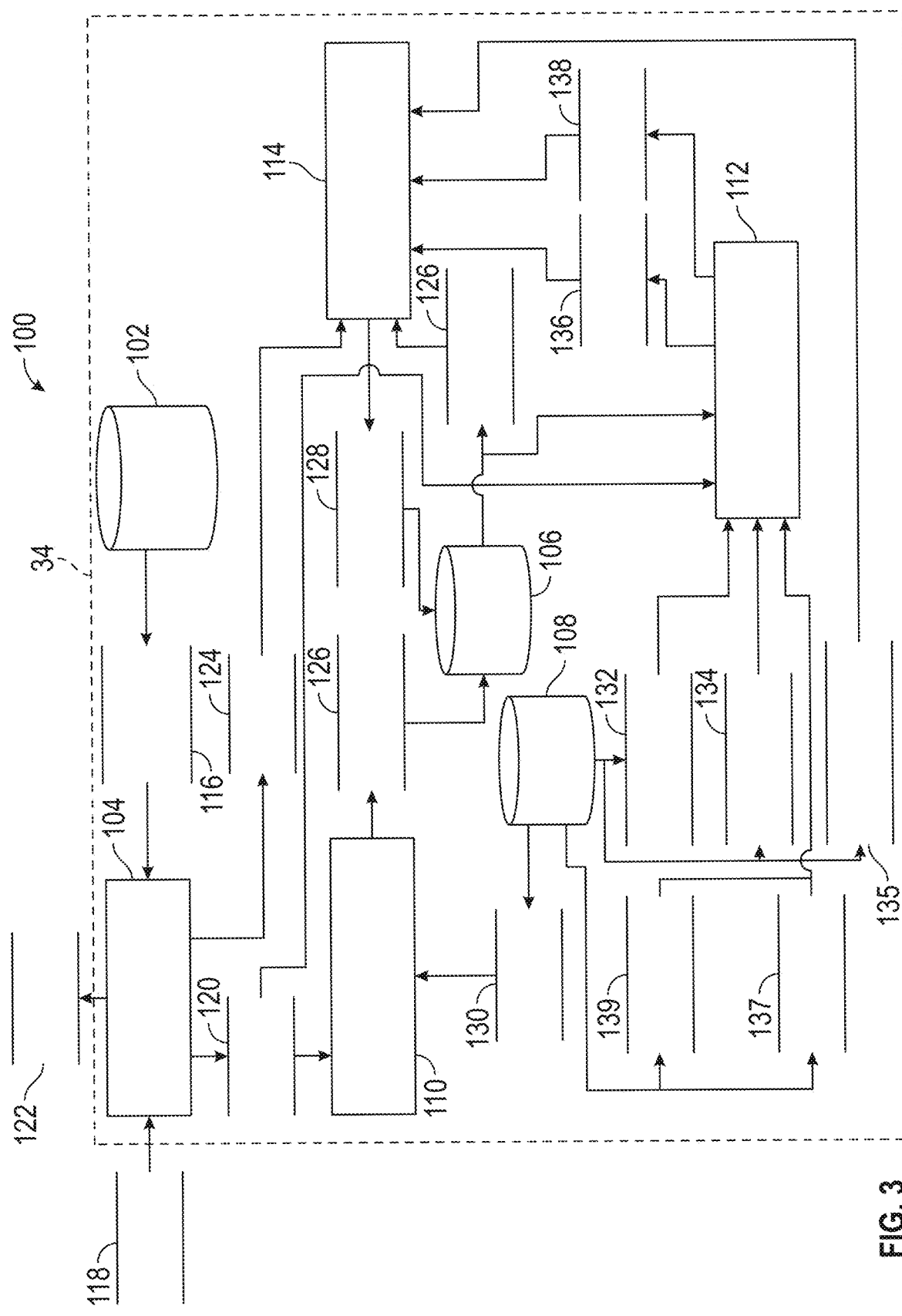

For example, as shown in more detail with regard to FIG. 3 and with continued reference to FIGS. 1 and 2, a dataflow diagram illustrates various embodiments of the classification and detection system 100, which may be embedded within the controller 34. Various embodiments of the classification and detection system 100 according to the present disclosure can include any number of sub-modules embedded within the controller 34. As can be appreciated, the sub-modules shown in FIG. 3 can be combined and/or further partitioned to similarly determine whether the received signals from the receiving antennas 45 contain noise or an object detection for use in controlling the autonomous vehicle 10. Inputs to the classification and detection system 100 may be received from the radar system 40a (FIG. 1), received from other control modules (not shown) associated with the autonomous vehicle 10, and/or determined/modeled by other sub-modules (not shown) within the controller 34. In various embodiments, the classification and detection system 100 includes an integral image datastore 102, an initial image module 104, a detection datastore 106, a threshold datastore 108, a threshold energy determination module 110, a neighborhood determination module 112 and an energy determination module 114.

Figure 4:
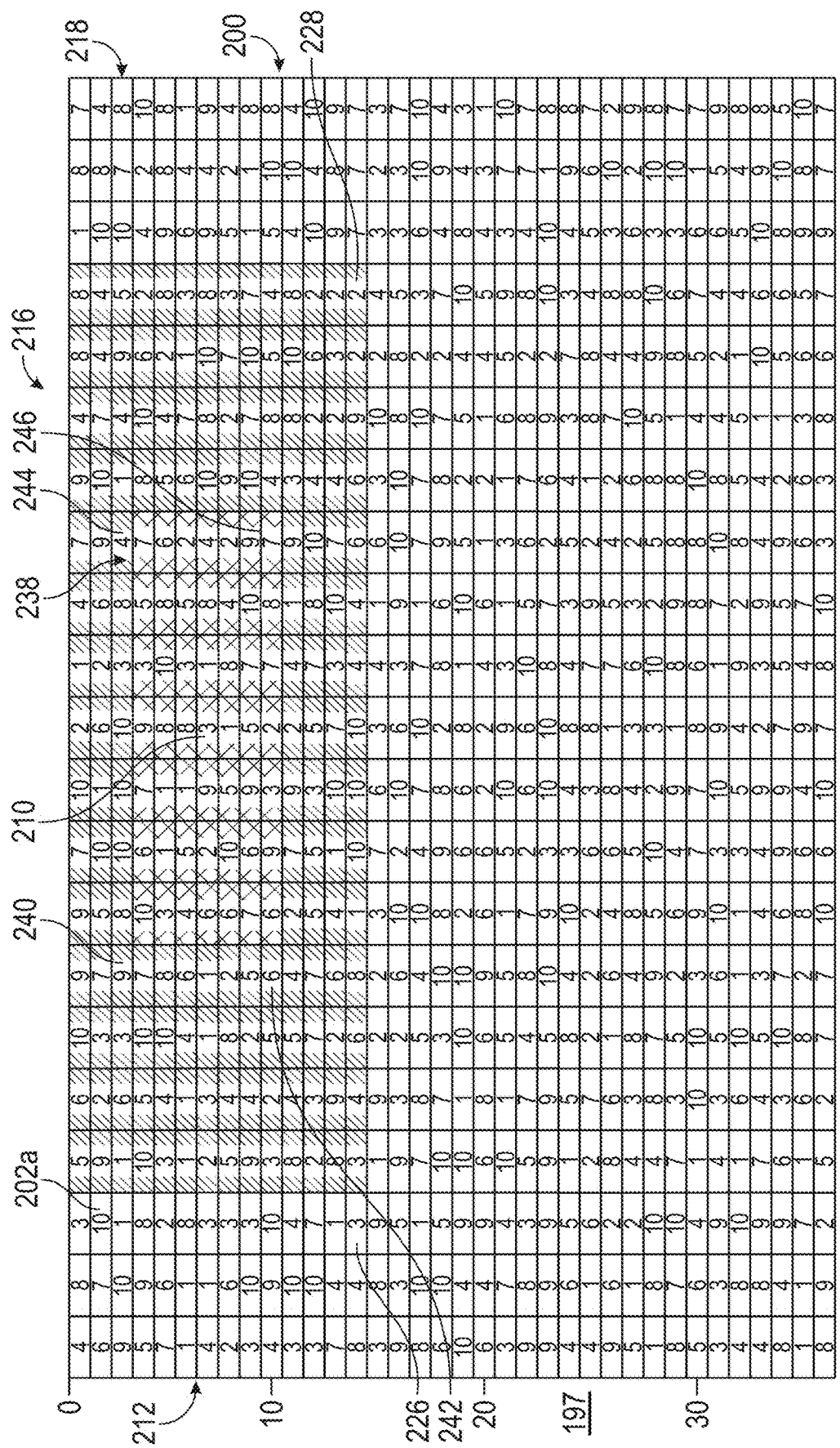
Figure 5:
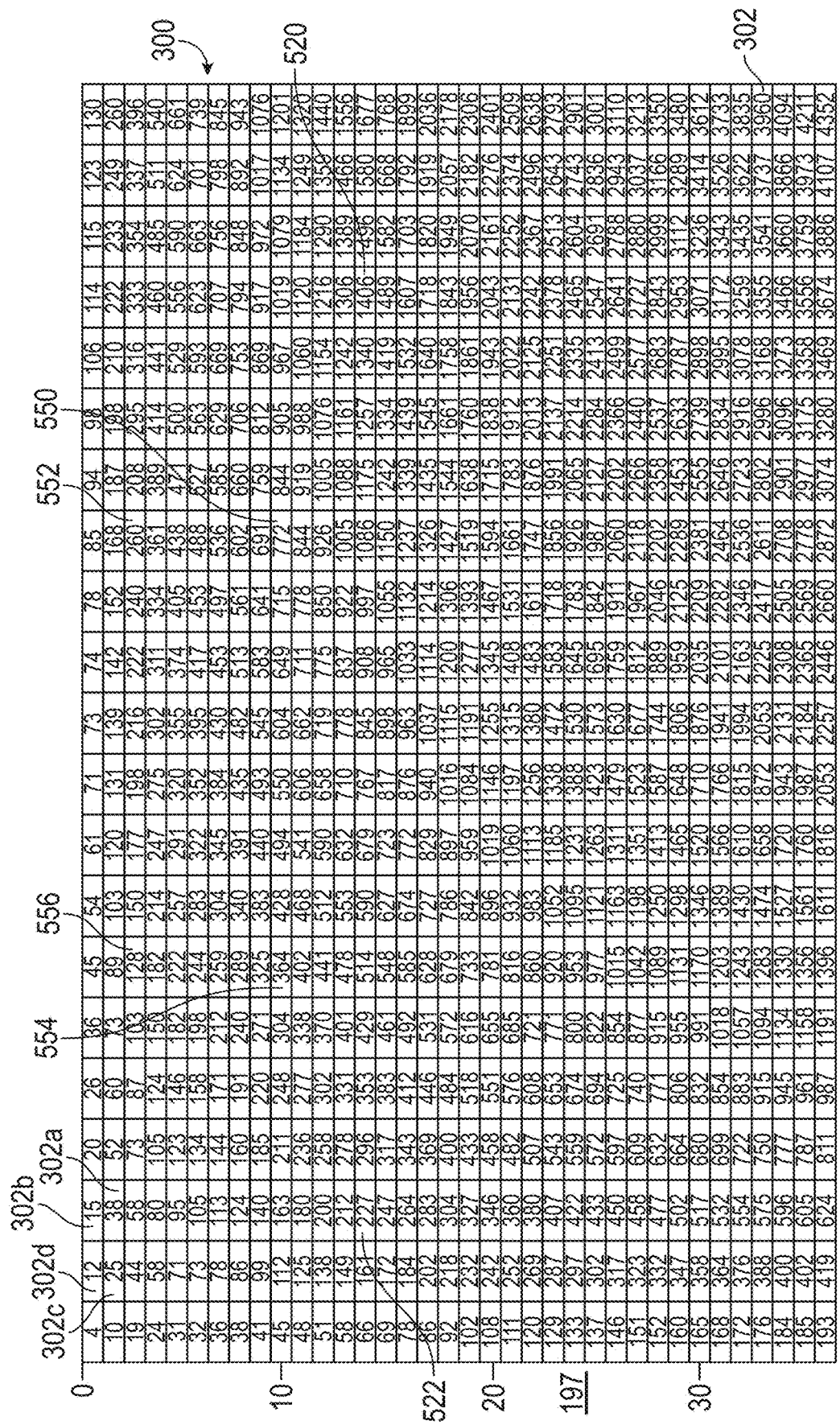

The integral image datastore 102 stores an integral image data structure 116 for generating an integral image from the signals received by the receiving antenna 45. In one example, the integral image data structure 116 comprises a plurality of cells, which are each pre-populated with an equation for calculating an integral image based on the values associated with the signals received from the receiving antenna 45 (FIG. 1). In this example, each of the cells contained in the integral image data structure 116 contain the following equation:

$$ii(x,y)=i(x,y)+ii(x-1,y)+ii(x,y-1)-ii(x-1,y-1) \quad (1)$$

Wherein ii denotes the cell of the integral image; i denotes the cell of the initial image; x is the doppler coordinate value; and y is the range coordinate value. Generally, the integral image comprises a plurality of cells each having a value determined based on equation (1) and the energy values from the initial image. As an example, with reference to FIGS. 4 and 4A, a portion of an initial image 200 is shown, with the energy values associated with each particular cell 202 provided in decibels (Db). FIG. 4B also shows a portion of an initial image 200, with the energy values associated with each particular cell provided in decibels (Db). Generally, doppler 198 is along the x-axis, and range 197 is on the y-axis. As will be discussed, using the integral image data structure 116 stored in the integral image datastore 102 and the initial image 200 received by the radar system 40a (FIG. 1) the initial image module 104 populates an integral image 300 having a corresponding plurality of cells 302, as shown in FIGS. 5 and 5A. In FIGS. 5 and 5A, the integral image 300 is generated based on the energy values of each of the cells 202 in the initial image 200 of FIGS. 4 and 4A and equation (1). In FIG. 5B, the integral image 300 is generated based on the energy values of each of the cells in the initial image 200 of FIG. 4B and equation (1). As an example, with reference to FIGS. 5 and 5A, the value of cell 302a is calculated as follows:

$$38(\text{cell}302a)=10(\text{cell}202a)+15(\text{cell}302b)+25(\text{cell}302c)-12(\text{cell}302d)$$

Thus, with reference back to FIG. 3, the integral image data structure 116 enables the efficient calculation of the energy values of surrounding cells by providing the integral image data structure 116 having the plurality of cells that are each pre-populated with equation (1). As will be discussed, the use of the integral image data structure 116 enables an energy sum for a cell under test to be determined with between about 8 to about 32 scalar operations, instead of about 380 hundred scalar operations, which enables the controller 34 to efficiently process all of the cells under test within the radar energy map and reduces a potential for missed detections.

Figure 6:
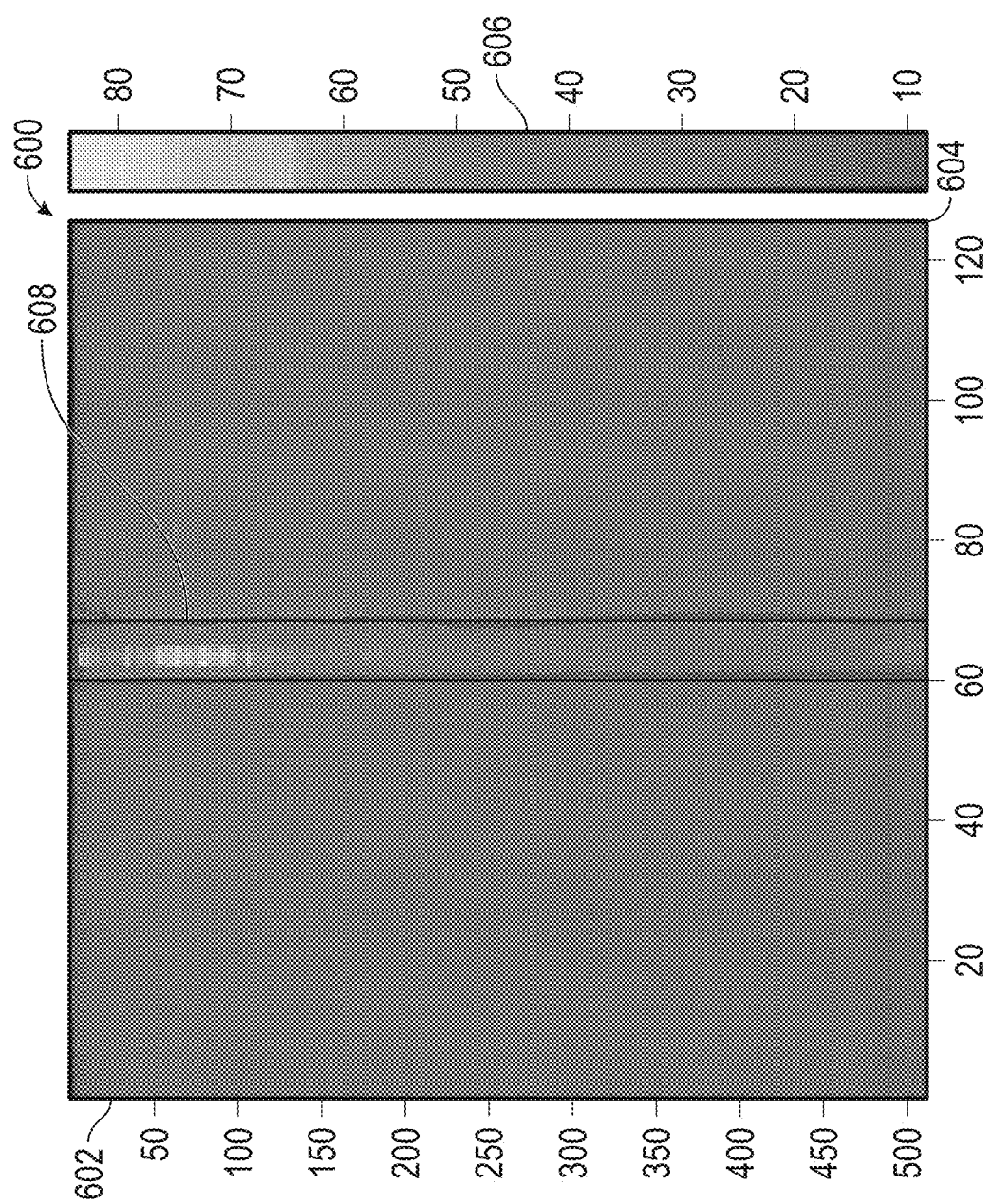
FIG. 6 is an example of a radar energy map received by the receiving antennas of the radar system, which indicates a dedicated zone for removal to generate the initial image in accordance with various embodiments.

The initial image module 104 receives as input received signals 118 received by the receiving antennas 45 from the transceiver module 41 of the radar system 40a (FIG. 1). The received signals 118 provide a radar energy map 600, as shown in FIG. 6. In FIG. 6, range (in meters) is provided on a y-axis 602, and doppler (in meters per second) is provided on an x-axis 604. Each cell (doppler, range) has an energy value in decibels (dB). A scale 606 provides a reference for the energy value associated with each coordinate cell (doppler, range).

Generally, the radar energy map 600 is computed by another control module associated with the controller 34. In one example, each of the transmitting antennas 43 transmits at different time in a time-division multiple access (TDMA) manner such that each of the transmitting antennas 43 transmit sequentially. Each transmission is detected simultaneously by the receiving antennas 45, and sampled a predefined or predetermined number of times. For each cycle of transmitting by the transmitting antennas 43 and receiving by the receiving antennas 45 there are a predefined or predetermined number of channels. This cycle of transmitting by the transmitting antennas 43 and receiving by the receiving antennas 45 is repeated a predefined or predetermined number of times.

A range fast Fourier transform (FFT) followed by doppler fast Fourier transform (FFT) are performed by a processor of the other control module associated with the controller 34 on the signals. After the range FFT and the doppler FFT, a radar cube is generated by the processor of the other control module. The radar cube is compressed to the radar energy map 600 by calculating, by the processor of the other control module, the norm of each cell and summing upon all cells in the channel axis. This results in the radar energy map 600, which changes a 3D radar point cloud into a 2D grid map.

Each target is stored in a cell in the radar energy map (a 2D grid) according to its radial distance (range) (i.e. radius distance) and its radial velocity (doppler). Thus, each cell has a coordinate location (x,y) based on the (doppler, range) associated with each cell. Generally, the energy of a target leaks to neighboring cells. The classification and detection system 100 processes the radar energy map 600 to determine the cells with the target's highest energy and not on the leakages.

Figure 7:
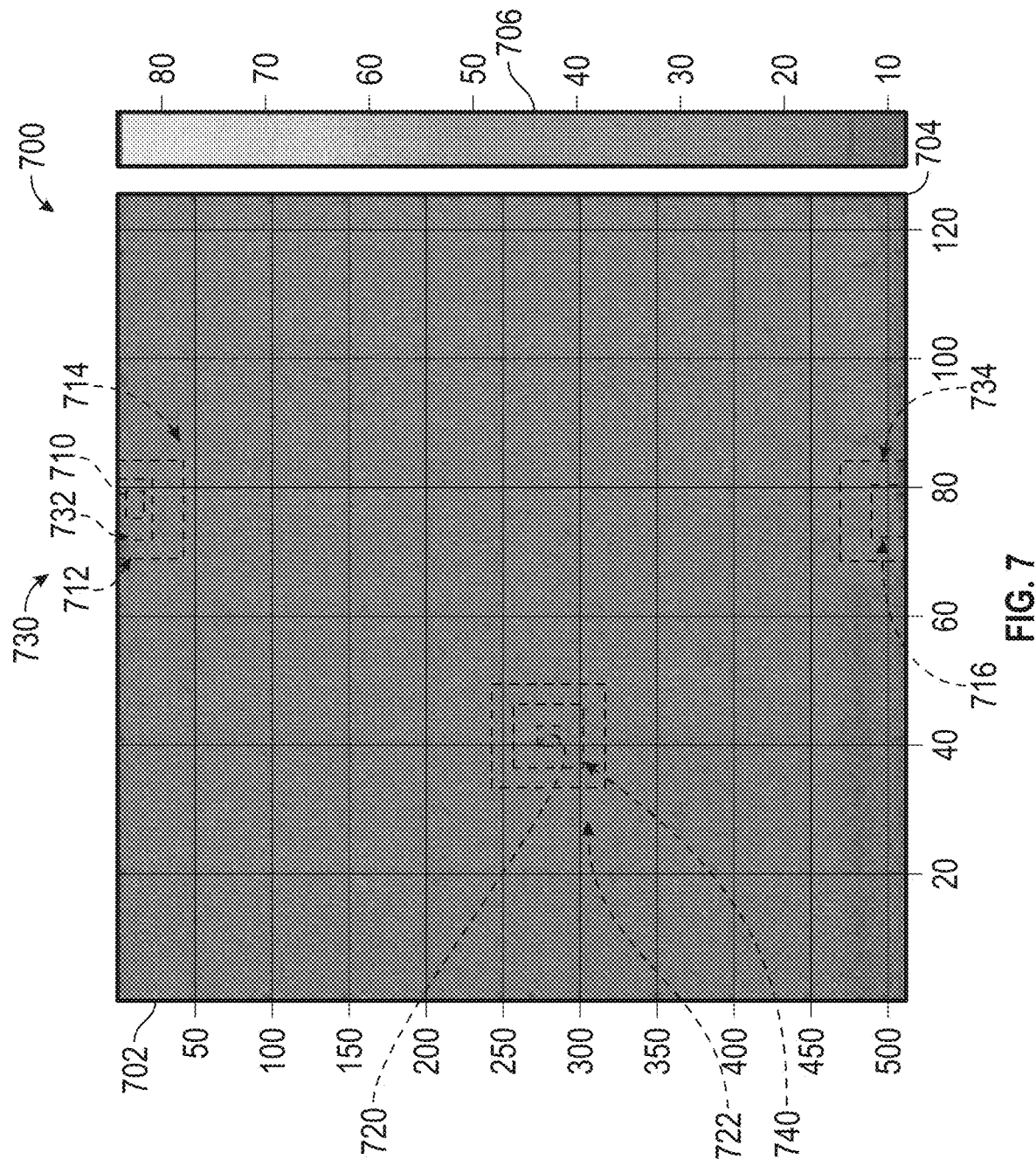
FIG. 7 is an example of the initial image generated based on the removal of the dedicated zone from the radar energy map of FIG. 6 in accordance with various embodiments.

With reference to FIGS. 2 and 6, based on the receipt of the received signals 118, the initial image module 104 removes a dedicated zone 608 from the radar energy map 600. The dedicated zone 608 is a zone that has a high energy, which is caused by the transmitting signals from the transmitting antennas 43 (FIG. 1) reflecting off a static object and being received by the receiving antenna 45. The initial image module 104 removes the dedicated zone 608 from the initial radar energy map 600 to form an initial image 700, which is shown in FIG. 7. (A 2D grid of energy values for a portion of an exemplary initial image is shown in FIGS. 4 and 4A; and FIG. 4B.) In one example, the initial image module 104 removes the dedicated zone 608 by comparing the energy values of the cells in the radar energy map 600 to a threshold, stored in the threshold datastore 108, for example, and removes the dedicated zone 608 based on the energy values of the cells being greater than the threshold. In FIG. 7, the initial image 700 is devoid of the zone of high energy, and includes the range (in meters) on a y-axis 702, and the doppler (in meters per second) on the x-axis 704. The scale 706 provides a reference for the energy value associated with each cell (doppler, range). With reference back to FIG. 2, the initial image module 104 sets initial image 120 for the threshold energy determination module 110 and for the neighborhood determination module 112. The initial image 120 is the radar energy map that remains from the radar energy map that was received from the received signals 118 after the dedicated zone is removed. Stated another way, in this example, the initial image 120 is the initial image 700 (FIG. 7), which was generated by removing the dedicated zone 608 (FIG. 6) from the radar energy map 600 (FIG. 6) provided from the received signals 118. The initial image 120 comprises a plurality of initial cells in a 2D grid, each having an energy value from the radar energy map.

Based on the initial image 120, the initial image module 104 generates integral image 124. In one example, the initial image module 104 retrieves the integral image data structure 116 from the integral image datastore 102. The initial image module 104 populates each cell of the integral image data structure 116 with the energy values for the associated cell of the initial image. As the integral image data structure 116 is stored with the equation (1) in each cell, as the energy values from the initial image are populated into the integral image data structure 116, the value of each associated cell in the integral image 124 is determined using the values from the initial image 120 and equation (1) as discussed above. The initial image module 104 sets the integral image 124 for the energy determination module 114.

Figure 8:
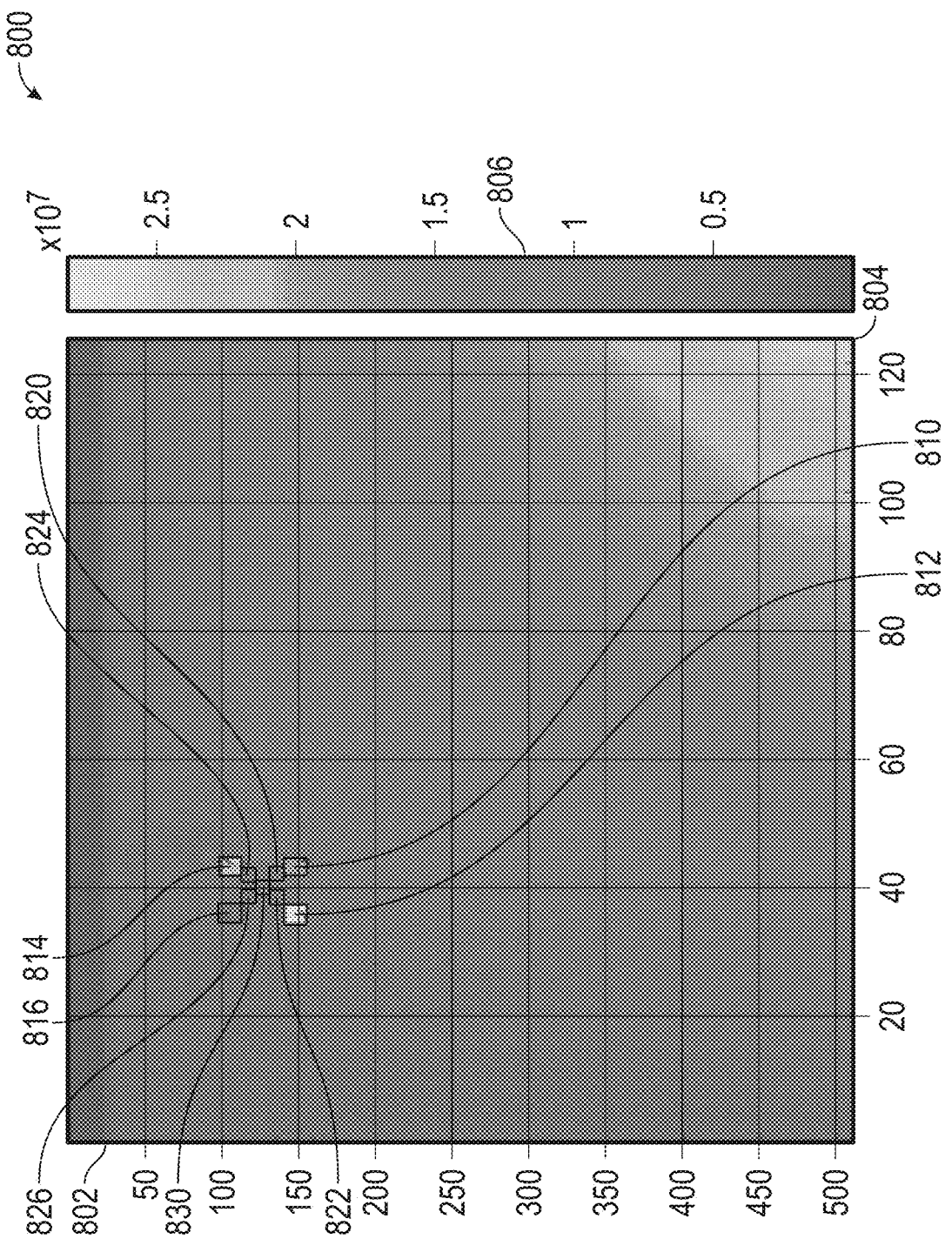
FIG. 8 is an example of an integral image generated based on the integral image data structure and the initial image of FIG. 7 in accordance with various embodiments.

In one example, with reference to FIG. 8 an integral image 800 is shown. The integral image 800 is generated based on the energy values in the cells associated with the initial image 700 of FIG. 7 using the integral image data structure 116 (FIG. 2). Thus, the energy values in the cells of the initial image 700 (FIG. 7) were used to compute the values in each corresponding cell of the integral image 800 using the stored integral image data structure 116 (FIG. 2) in which each cell of the integral image 800 is calculated based on equation (1) and the energy value from the associated cell of the initial image 700 (FIG. 7).

With reference back to FIG. 2, the detection datastore 106 stores data of cells under test 126 that are determined to be possible detections. In one example, the detection datastore 106 stores coordinate values for the cells under test 126 in the initial image 120 that are identified by the threshold energy determination module 110. Thus, the detection datastore 106 may be populated by the threshold energy determination module 110. In various embodiments, for each cell under test 126 stored in the detection datastore 106, the cell under test 126 may have an associated qualification 128. As will be discussed, the energy determination module 114 may qualify each detected cell under test 126 and associate the qualification (noise or detection) with the respective cell under test 126 and store this in the detection datastore 106. Thus, in various embodiments, the detection datastore 106 is also populated by the energy determination module 114. The detection datastore 106 may be accessed by other modules associated with the autonomous driving system 70, such as the guidance system 78, to retrieve the cells qualified as detections. In other embodiments, a module associated with the computer vision system 74 may access the detection datastore 106 and retrieve the detections for further processing. For example, the detections may be transmitted to the guidance system 78 to determine which objects are in the close proximity to the vehicle 10, and in turn, the guidance system 78 may determine which direction and speed to control the vehicle 10 based on the objects.

The threshold datastore 108 stores data of thresholds associated with the classification and detection system 100. In this example, the detection datastore 106 stores an energy threshold 130, a neighborhood threshold 132, a guard threshold 134, a noise threshold 135, a doppler limit threshold 137 and a range limit threshold 139. The energy threshold 130, the neighborhood threshold 132, the guard threshold 134 and the noise threshold 135 are each predefined, default or factory set values. The energy threshold 130 is a threshold for an energy value of a cell in the initial image 120. In one example, the energy threshold 130 is about 30 to about 38 decibels (dB). The neighborhood threshold 132 is a threshold for a number of cells in a window or neighborhood of the initial image 120. In one example, the neighborhood threshold 132 is about 7 to about 10 cells. The guard threshold 134 is a threshold for a number of cells in a guard within the neighborhood of the initial image 120. In one example, the guard threshold 134 is about 0 to about 3 cells. The noise threshold 135 is a threshold for a margin of error associated with an estimated noise. In one example, the noise threshold 135 is a predefined value for the margin of error. In this example, the noise threshold 135 is about 25 decibels (dB). The doppler limit threshold 137 is a predefined value for a limit of the doppler values of the radar energy map 600. In one example, the doppler limit threshold 137 is about 128. The range limit threshold 139 is a predefined value for a limit of the doppler values of the radar energy map 600. In one example, the range limit threshold 139 is about 512.

The threshold energy determination module 110 receives as input the initial image 120. The threshold energy determination module 110 retrieves the energy threshold 130 from the threshold datastore 108. The threshold energy determination module 110 compares each cell in the initial image 120 to the energy threshold 130. If the value of the energy in a particular cell is greater than the energy threshold 130, the threshold energy determination module 110 stores the coordinate location (doppler, range) of the cell as the cell under test 126 in the detection datastore 106. If the value of the energy for a particular cell is less than or equal to the energy threshold 130, the threshold energy determination module 110 proceeds to the next cell. The threshold energy determination module 110 repeats this comparison of the energy of each cell to the energy threshold 130 until all of the cells of the initial image 120 are compared to the energy threshold 130. It should be noted that the threshold energy determination module 110 may be optional, and the classification and detection system 100 may treat each cell as a cell under test without an initial comparison to the energy threshold 130.

The neighborhood determination module 112 queries the detection datastore 106 and retrieves a first one of the cell(s) under test 126. The neighborhood determination module 112 queries the threshold datastore 108 and retrieves the neighborhood threshold 132, the doppler limit threshold 137 and the range limit threshold 139. Based on the coordinate location (doppler, range) of the cell under test 126 in the initial image 120, the neighborhood determination module 112 constructs the neighborhood or window around the coordinate location (doppler, range) of the cell under test 126. In this example, the neighborhood determination module 112 constructs the neighborhood based on the number of cells contained in the neighborhood threshold 132, the doppler limit threshold 137 and the range limit threshold 139. For example, based on the neighborhood threshold 132 and the coordinate location (doppler, range) of the cell under test 126, the neighborhood determination module 112 determines if there are enough cells in the initial image 120 surrounding the cell under test 126 to provide a neighborhood. If there are not enough cells surrounding the cell under test 126, the neighborhood determination module 112 breaks the neighborhood into smaller rectangles, squares or portions. Stated another way, the neighborhood determination module 112 wraps around the initial image 120 to borrow cells from the top (if there are not enough cells in the initial image 120 below the cell under test 126); the bottom (if there are not enough cells in the initial image 120 above the cell under test 126); the left side (if there are not enough cells in the initial image 120 to the right of the cell under test 126); and/or the right side (if there are not enough cells in the initial image 120 to the left of the cell under test 126) to form additional rectangles, squares or portions to define the neighborhood. The neighborhood determination module 112 borrows the number of cells by wrapping around the initial image 120 to ensure that the number of cells in the neighborhood surrounding the cell under test 126 matches or corresponds with the number of cells in the neighborhood threshold 132.

For example, with reference to FIG. 7, a cell under test 710 is shown. In the example of the neighborhood threshold 132 of about 10, the number of cells surrounding the cell under test 710 is not sufficient to form a neighborhood 712. In this example, the neighborhood determination module 112 breaks the neighborhood 712 into a first portion 714 and a second portion 716. Thus, the neighborhood determination module 112 wraps around to a bottom of the initial image 700 to borrow the number of cells needed around the cell under test 710 to form the neighborhood 712 that matches the number of cells in the neighborhood threshold 132. As a further example, a cell under test 720 is shown. As the cell under test 720 is surrounded with enough cells to form a neighborhood 722 that matches or corresponds with the neighborhood threshold 132.

Generally, the neighborhood 712, 722 is rectangular or square such that starting from the cell under test 710, the neighborhood determination module 112 forms the neighborhood based on the neighborhood threshold 132 of 10 by taking 10 cells above the cell under test 710, 720; 10 cells below the cell under test 710, 720; 10 cells to the right of the cell under test 710, 720; and 10 cells to the left of the cell under test 710, 720 (and wraps the cells when needed as discussed with regard to the cell under test 710). The neighborhood determination module 112 forms the neighborhood 712, 722 as a rectangle or square around the cells defined by the neighborhood threshold 132.

In this regard, as a further example, with reference to FIGS. 4 and 4A, a cell under test 210 is shown in the 2D grid. In the example of FIGS. 4 and 4A, the classification and detection system 100 is treating each cell as a cell under test without performing the initial comparison of the energy value to the energy threshold 130. The cell under test 210 has an energy value of 3. Based on the neighborhood threshold 132 of 7, for example, the neighborhood determination module 112 identifies the 7 cells above, below, right and left of the cell under test 210 to form a neighborhood 212. In this example, the neighborhood determination module 112 breaks the neighborhood 212 into two portions 214, 216 and wraps around the initial image 200. The neighborhood 212 includes all of the cells contained within a rectangle 218 (for portion 214), 220 (for portion 216) defined by the 7 cells above, below, right and left.

As a further example, with reference to FIG. 4B, a cell under test 250 is shown. In this example, the classification and detection system 100 is performing an initial thresholding, and the cell under test 250 has an energy value of 38, which is greater than the energy threshold 130. Based on the neighborhood threshold 132 of 7, the neighborhood determination module 112 identifies the 7 cells above, below, right and left of the cell under test 250 to form a neighborhood 252. In this example, there are enough cells around the cell under test 250 to form the neighborhood 252 without wrapping around the initial image 200. The neighborhood 252 includes all of the cells contained within a rectangle defined by the 7 cells above, below, right and left of the cell under test 250.

With reference back to FIG. 2, with the neighborhood constructed, the neighborhood determination module 112 determines the indices (doppler, range) of the four corners of the rectangle(s), square(s) or portion(s) associated with the neighborhood. Stated another way, the neighborhood determination module 112 determines the coordinate locations (doppler, range) of the cells associated with the four corners of the rectangle(s), square(s) or portion(s) that defines the neighborhood. In instances where the neighborhood has been broken into additional portions or has been wrapped around the initial image 120, the neighborhood determination module 112 determines the indices of each portion (or rectangle) of the neighborhood. The neighborhood determination module 112 sets the coordinate locations (doppler, range) of the cells of the indices as window data 136 for the energy determination module 114. The window data 136 comprises the coordinate locations (doppler, range) of the indices (the cells associated with the corners of the rectangle(s) or square(s)) associated with the neighborhood, which may include multiple indices depending upon whether the neighborhood was broken into portions or wrapped around the initial image 120.

In one example, the neighborhood determination module 112 determines the indices by starting with the coordinate location (doppler, range) of the cell under test and the neighborhood threshold 132. The neighborhood determination module 112 determines a Range_Start value, a Range_End value, a Doppler_Start value and a Doppler_End value for each portion of the neighborhood. In instances where the neighborhood is not wrapped around the initial image 120, the neighborhood determination module 112 determines these values based on the following equations:

$$Range\_Start=Range_{CUT}-Threshold_W \quad (2)$$

$$Range\_End=Range_{CUT}+Threshold_W \quad (3)$$

$$Doppler\_Start=Doppler_{CUT}-Threshold_W \quad (4)$$

$$Doppler\_End=Doppler_{CUT}+Threshold_W \quad (5)$$

Wherein Range_Start is the starting range value for the neighborhood; Range_End is the ending range value for the neighborhood; Doppler_Start is the starting doppler value for the neighborhood; Doppler_End is the ending doppler value for the neighborhood; $Doppler_{CUT}$ is the doppler value of the cell under test; $Range_{CUT}$ is the range value of the cell under test; and $Threshold_W$ is the neighborhood threshold 132. In instances where the neighborhood has been broken into portions, the neighborhood determination module 112 determines the Range_Start value, the Range_End value, the Doppler_Start value and the Doppler_End value for each portion based on the neighborhood threshold 132, the doppler limit threshold 137 and the range limit threshold 139.

In one example, the neighborhood determination module 112 determines the Range_End value based on equation (3) or whether the sum of the range of the cell under test and the neighborhood threshold 132 is greater than the range limit threshold 139. If the sum of the range of the cell under test and the neighborhood threshold 132 is greater than the range limit threshold 139, the Range_End is the range limit threshold minus the sum of the range of the cell under test and the neighborhood threshold 132. The neighborhood determination module 112 determines the Range_Start value based on equation (2) or whether the value of the range of the cell under test minus the neighborhood threshold 132 is less than one. If the value of the range of the cell under test minus the neighborhood threshold 132 is less than one, the Range_Start is the sum of the range limit threshold 139 and the difference between the range of the cell under test and the neighborhood threshold 132. In one example, the neighborhood determination module 112 determines the Doppler_End value based on equation (5) or whether the sum of the doppler of the cell under test and the neighborhood threshold 132 is greater than the doppler limit threshold 137. If the sum of the doppler of the cell under test and the neighborhood threshold 132 is greater than the doppler limit threshold 137, the Doppler_End is the doppler limit threshold minus the sum of the doppler of the cell under test and the neighborhood threshold 132. The neighborhood determination module 112 determines the Doppler_Start value based on equation (4) or whether the value of the doppler of the cell under test minus the neighborhood threshold 132 is less than one. If the value of the doppler of the cell under test minus the neighborhood threshold 132 is less than one, the Doppler_Start is the sum of the doppler limit threshold 137 and the difference between the doppler of the cell under test and the neighborhood threshold 132. With reference to FIGS. 4 and 4A, for the portion 216, the Range_Start is 1, the Range_End is 14, the Doppler_Start is 4 and the Doppler_End is 18. For the portion 214, the Range_Start is 43, the Range_End is 43, the Doppler_Start is 4 and the Doppler_End is 18.

The neighborhood determination module 112 determines the first index of the neighborhood as (Doppler_End, Range_End) and retrieves the value for the first index from the integral image. As will be discussed, the energy determination module 114 sets this value for the first index as the energy sum for the portion. The neighborhood determination module 112 determines whether the Range_Start minus one is greater than zero. If true, the neighborhood determination module 112 determines the second index as (Doppler_End, Range_Start−1). The energy determination module 114 retrieves the value for the second index from the integral image, and subtracts the value for the second index (from the integral image) from the energy sum for the portion. If the Range_Start minus one is not greater than zero, the neighborhood determination module 112 sets a summation for a diagonal to false to indicate that the neighborhood is wrapped around the initial image and does not compute the second index.

The neighborhood determination module 112 determines whether the Doppler_Start minus one is greater than zero. If true, the neighborhood determination module 112 determines the third index as (Doppler_Start−1, Range_End). As will be discussed, the energy determination module 114 retrieves the value for the third index from the integral image and subtracts the value for the third index (from the integral image) from the energy sum for the portion. If the Doppler_Start minus one is not greater than zero, the neighborhood determination module 112 sets a summation for a diagonal to false to indicate that the neighborhood is wrapped around the initial image and does not compute the third index.

The neighborhood determination module 112 determines whether the summation for the diagonal is true, the Range_Start minus one is greater than zero and the Doppler_Start minus one is greater than zero. The summation for the diagonal is true if the summation for the diagonal has not been set to false. If true, the neighborhood determination module 112 determines the fourth index as (Doppler_Start−1, Range_Start−1). As will be discussed, the energy determination module 114 retrieves the value for the fourth index from the integral image, and adds the value for the fourth index (from the integral image) from the energy sum for the portion. If the summation for the diagonal is false, the Range_Start minus one is not greater than zero or the Doppler_Start minus one is not greater than zero, the neighborhood determination module 112 does not compute the fourth index.

Generally, the bottom right corner index (Doppler_End, Range_End) is within the neighborhood (and each portion of the neighborhood when the neighborhood wraps around the initial image), while the remaining indices are outside of the neighborhood. In instances where the neighborhood has been wrapped around the initial image, the neighborhood determination module 112 computes the indices based on those that are available for the respective portions that have been wrapped around the initial image.

With reference back to FIG. 4B, in the example of the neighborhood 252, the neighborhood determination module 112 computes the indices based on the cell under test 250 having a doppler of 11 and a range of 15; and the neighborhood threshold 132 of 7. Based on the cell under test coordinate location (doppler 11, range 15) and the neighborhood threshold 132 of 7, as this neighborhood 252 was not broken into portions using equations (2)-(5), Range_Start is 8; Range_End is 22; Doppler_Start is 4; and Doppler_End is 18. The first index 260 is (doppler 18, range 22). The Range_Start minus one is greater than zero, and the second index 258 is (doppler 18, range 7). The Doppler_Start minus one is greater than zero, and the third index 256 is (doppler 3, range 22). As the diagonal is true, the Range_Start minus one is greater than zero and the Doppler_Start minus one is greater than zero, the fourth index 254 is (doppler 3, range 7).

With reference back to FIGS. 4 and 4A, in the example of the neighborhood 212, the neighborhood determination module 112 computes the indices for the portion 214, 216 based on the cell under test 210 having a doppler of 11 and a range of 7; and the neighborhood threshold 132 of 7. Based on the cell under test coordinate location (doppler 11, range 7) and the neighborhood threshold 132 of 7, the neighborhood determination module 112 determines that the neighborhood wraps around the initial image, and separates the neighborhood into the portions 214, 216. For each portion, the neighborhood determination module 112 determines the indices. For the portion 216, Range_Start is 1; Range_End is 14; Doppler_Start is 4; and Doppler_End is 18. The first index 228 is (Doppler_End, Range_End) or (doppler 18, range 14). The Range_Start minus one is not greater than zero and the diagonal is set to false. Thus, for the portion 216, the neighborhood determination module 112 does not compute the second index. The Doppler_Start minus one is greater than zero, and the third index 226 is (Doppler_Start−1, Range_End) or (doppler 3, range 14). As the diagonal has been set to false, the neighborhood determination module 112 does not compute the fourth index.

For the portion 214, the Range_Start is 43, the Range_End is 43, the Doppler_Start is 4 and the Doppler_End is 18. The first index 231 is (Doppler_End, Range_End) or (doppler 18, range 43). The Range_Start minus one is greater than zero and the second index 232 is (Doppler_End, Range_Start−1) or (doppler 18, range 42). The Doppler_Start minus one is greater than zero, and the third index 233 is (Doppler_Start−1, Range_End) or (doppler 3, range 43). As the diagonal is true, the Range_Start minus one is greater than zero and the Doppler_Start minus one is greater than zero, the fourth index 235 is (Doppler_Start−1, Range_Start−1) or (doppler 3, range 42).

Based on the neighborhood, the neighborhood determination module 112 also constructs a guard around the cell under test 126 within the neighborhood. The neighborhood determination module 112 queries the threshold datastore 108 and retrieves the guard threshold 134, the doppler limit threshold 137 and the range limit threshold 139. Based on the coordinate location (doppler, range) of the cell under test 126 in the initial image 120, the neighborhood determination module 112 constructs the guard around the coordinate location (doppler, range) of the cell under test 126. In this example, the neighborhood determination module 112 constructs the guard based on the number of cells contained in the guard threshold 134, the doppler limit threshold 137 and the range limit threshold 139. For example, based on the guard threshold 134 and the coordinate location (doppler, range) of the cell under test 126, the neighborhood determination module 112 determines if there are enough cells in the initial image 120 surrounding the cell under test 126 to provide a guard. If there are not enough cells surrounding the cell under test 126, the neighborhood determination module 112 breaks the guard into smaller rectangles. Stated another way, the neighborhood determination module 112 wraps around the initial image 120 to borrow cells from the top (if there are not enough cells in the initial image 120 below the cell under test 126); the bottom (if there are not enough cells in the initial image 120 above the cell under test 126); the left side (if there are not enough cells in the initial image 120 to the right of the cell under test 126); and/or the right side (if there are not enough cells in the initial image 120 to the left of the cell under test 126) to form additional rectangles to define the guard. The neighborhood determination module 112 borrows the number of cells by wrapping around the initial image 120 to ensure that the number of cells in the guard surrounding the cell under test 126 matches or corresponds with the number of cells in the guard threshold 134.

For example, with reference to FIG. 7, the cell under test 710 is shown. In the example of the guard threshold 134 of about 3, the number of cells surrounding the cell under test 710 is not sufficient to form a guard 730. In this example, the neighborhood determination module 112 breaks the guard 730 into a first guard portion 732 and a second guard portion 734. Thus, the neighborhood determination module 112 wraps around to a bottom of the initial image 700 to borrow the number of cells needed around the cell under test 710 to form the guard 730 that matches the number of cells in the guard threshold 134. As a further example, the cell under test 720 is surrounded with enough cells to form a guard 740 that matches or corresponds with the guard threshold 134.

Generally, the guard 730, 740 is rectangular or square such that starting from the cell under test 710, the neighborhood determination module 112 forms the guard 730, 740 based on the guard threshold 134 by taking 3 cells above the cell under test 710, 720; 3 cells below the cell under test 710, 720; 3 cells to the right of the cell under test 710, 720; and 3 cells to the left of the cell under test 710, 720 (and wraps the cells when needed as discussed with regard to the cell under test 710). The neighborhood determination module 112 forms the guard 730, 740 as a rectangle or square around the cells defined by the guard threshold 134.

As a further example, with reference to FIGS. 4 and 4A, based on the guard threshold 134 of 3, the neighborhood determination module 112 identifies the 3 cells above, below, right and left of the cell under test 210 to form a guard 236. In this example, as there are enough cells the form the guard 236, the neighborhood determination module 112 does not break the guard into portions. The guard 236 includes all of the cells contained within a rectangle 238 defined by the 3 cells above, below, right and left of the cell under test 210. With reference to FIG. 4B, as another example, based on the guard threshold 134 of 3, the neighborhood determination module 112 identifies the 3 cells above, below, right and left of the cell under test 250 to form a guard 264. In this example, as there are enough cells the form the guard 264, the neighborhood determination module 112 does not break the guard into portions. The guard 264 includes all of the cells contained within a rectangle 238 defined by the 3 cells above, below, right and left of the cell under test 250.

With reference back to FIG. 2, with the guard constructed, the neighborhood determination module 112 determines the indices (doppler, range) of the four corners of the rectangle(s), square(s) or portion(s) associated with the guard. Stated another way, the neighborhood determination module 112 determines the coordinate locations (doppler, range) of the cells associated with the four corners of the rectangle(s) or square(s) that defines the guard. In instances where the guard has been broken into additional portions or has been wrapped around the initial image 120, the neighborhood determination module 112 determines the indices of each portion (or rectangle) of the guard. The neighborhood determination module 112 sets the coordinate locations (doppler, range) of the cells of the guard indices as guard data 138 for the energy determination module 114. The guard data 138 comprises the coordinate locations (doppler, range) of the indices (the cells associated with the corners of the rectangle(s), square(s) or portion(s)) associated with the guard, which may include multiple indices depending upon whether the guard was broken or wrapped around the initial image 120.

In one example, the neighborhood determination module 112 determines the indices by starting with the coordinate location (doppler, range) of the cell under test and the guard threshold 134. The neighborhood determination module 112 determines a Range_Start guard value, a Range_End guard value and a Doppler_Start guard value and a Doppler_End guard value for each portion of the neighborhood. In instances where the neighborhood is not wrapped around the initial image 120, in one example, the neighborhood determination module 112 determines these values based on the following equations:

$$\text{Range\_Start Guard} = \text{Range}_{CUT} - \text{Threshold}_G \quad (6)$$

$$\text{Range\_End Guard} = \text{Range}_{CUT} + \text{Threshold}_G \quad (7)$$

$$\text{Doppler\_Start Guard} = \text{Doppler}_{CUT} - \text{Threshold}_G \quad (8)$$

$$\text{Doppler\_End Guard} = \text{Doppler}_{CUT} + \text{Threshold}_G \quad (9)$$

Wherein Range_Start Guard is the starting range value for the guard; Range_End Guard is the ending range value for the guard; Doppler_Start Guard is the starting doppler value for the guard; Doppler_End Guard is the ending doppler value for the guard; $\text{Doppler}_{CUT}$ is the doppler value of the cell under test; $\text{Range}_{CUT}$ is the range value of the cell under test; and $\text{Threshold}_G$ is the guard threshold 134.

In one example, the neighborhood determination module 112 determines the Range_End Guard value based on equation (7) or whether the sum of the range of the cell under test and the guard threshold 134 is greater than the range limit threshold 139. If the sum of the range of the cell under test and the guard threshold 134 is greater than the range limit threshold 139, the Range_End Guard is the range limit threshold minus the sum of the range of the cell under test and the guard threshold 134. The neighborhood determination module 112 determines the Range_Start Guard value based on equation (6) or whether the value of the range of the cell under test minus the guard threshold 134 is less than one. If the value of the range of the cell under test minus the guard threshold 134 is less than one, the Range_Start Guard is the sum of the range limit threshold 139 and the difference between the range of the cell under test and the guard threshold 134. In one example, the neighborhood determination module 112 determines the Doppler_End Guard value based on equation (9) or whether the sum of the doppler of the cell under test and the guard threshold 134 is greater than the doppler limit threshold 137. If the sum of the doppler of the cell under test and the guard threshold 134 is greater than the doppler limit threshold 137, the Doppler_End Guard is the doppler limit threshold minus the sum of the doppler of the cell under test and the guard threshold 134. The neighborhood determination module 112 determines the Doppler_Start Guard value based on equation (8) or whether the value of the doppler of the cell under test minus the guard threshold 134 is less than one. If the value of the doppler of the cell under test minus the guard threshold 134 is less than one, the Doppler_Start Guard is the sum of the doppler limit threshold 137 and the difference between the doppler of the cell under test and the guard threshold 134.

The neighborhood determination module 112 determines the first guard index of the guard as (Doppler_End Guard, Range_End Guard). As will be discussed, the energy determination module 114 retrieves the value for the first index from the integral image and sets this value for the first guard index as the guard energy sum for the portion. The neighborhood determination module 112 determines whether the Range_Start Guard minus one is greater than zero. If true, the neighborhood determination module 112 determines the second guard index as (Doppler_End Guard, Range_Start Guard−1). The energy determination module 114 retrieves the value for the second guard index from the integral image, and subtracts the value for the second guard index (from the integral image) from the guard energy sum for the portion. If the Range_Start Guard minus one is not greater than zero, the neighborhood determination module 112 sets a summation for a diagonal to false to indicate that the guard is wrapped around the initial image and does not compute the second guard index.

The neighborhood determination module 112 determines whether the Doppler_Start Guard minus one is greater than zero. If true, the neighborhood determination module 112 determines the third index as (Doppler_Start Guard−1, Range_End Guard). As will be discussed, the energy determination module 114 retrieves the value for the third guard index from the integral image and subtracts the value for the third guard index (from the integral image) from the guard energy sum for the portion. If the Doppler_Start Guard minus one is not greater than zero, the neighborhood determination module 112 sets a summation for a diagonal to false to indicate that the guard is wrapped around the initial image and does not compute the third guard index.

The neighborhood determination module 112 determines whether the summation for the diagonal is true, the Range_Start Guard minus one is greater than zero and the Doppler_Start Guard minus one is greater than zero. The summation for the diagonal is true if the summation for the diagonal has not been set to false. If true, the neighborhood determination module 112 determines the fourth guard index as (Doppler_Start Guard−1, Range_Start Guard−1). As will be discussed, the energy determination module 114 retrieves the value for the fourth guard index from the integral image and adds the value for the fourth guard index (from the integral image) from the guard energy sum for the portion. If the summation for the diagonal is false, the Range_Start Guard minus one is not greater than zero or the Doppler_

Start Guard minus one is not greater than zero, the neighborhood determination module 112 does not compute the fourth guard index.

With reference back to FIGS. 4 and 4A, in the example of the guard 236, the neighborhood determination module 112 computes the indices based on the cell under test 210 having a doppler of 11 and a range of 7; and the guard threshold 134 of 3. Based on the cell under test 210 at (doppler 11, range 7) and the guard threshold 134 of 3, using equations (6)-(9), Range_Start Guard is 4; Range_End Guard is 10; Doppler_Start Guard is 8; and Doppler_End Guard is 14. The first guard index 246 is (doppler 14, range 10). The Range_Start Guard minus one is greater than zero, and the second guard index 244 is (doppler 14, range 3). The Doppler_Start Guard minus one is greater than zero, and the third guard index 242 is (doppler 7, range 10). As the diagonal is true, the Range_Start Guard minus one is greater than zero and the Doppler_Start Guard minus one is greater than zero, the fourth guard index 240 is (doppler 7, range 3).

With reference back to FIG. 4B, in the example of the guard 264, the neighborhood determination module 112 computes the indices based on the cell under test 250 having a doppler of 11 and a range of 23; and the guard threshold 134 of 3. Based on the cell under test 250 at (doppler 11, range 15) and the guard threshold 134 of 3, using equations (6)-(9), Range_Start Guard is 12; Range_End Guard is 18; Doppler_Start Guard is 8; and Doppler_End Guard is 14. The first guard index 272 is (doppler 14, range 18). The Range_Start Guard minus one is greater than zero, and the second guard index 270 is (doppler 14, range 11). The Doppler_Start Guard minus one is greater than zero, and the third guard index 268 is (doppler 7, range 18). As the diagonal is true, the Range_Start Guard minus one is greater than zero and the Doppler_Start Guard minus one is greater than zero, the fourth guard index 266 is (doppler 7, range 11).

With reference back to FIG. 2, the energy determination module 114 queries the detection datastore 106 and retrieves the first one of the cell(s) under test 126. The energy determination module 114 receives as input the integral image 124 and the window data 136. Based on the coordinate location (doppler, range) of the cells contained in the window data 136, the energy determination module 114 retrieves from the integral image 124 the values of the cells in the integral image at the associated coordinate location (doppler, range). Stated another way, for each of the indices in the window data 136, the energy determination module 114 retrieves the value of the cell in the integral image at the coordinate location (doppler, range) that matches the coordinate location (doppler, range) of the cell of the respective window index. The energy determination module 114 calculates the energy of the neighborhood based on the following equation:

$$E = \text{Index}_1 - \text{Index}_2 - \text{Index}_3 + \text{Index}_4 \quad (10)$$

Wherein E is the energy sum of the neighborhood; $\text{Index}_1$ is the value from the integral image of the first index (Doppler_End, Range_End) of the neighborhood; $\text{Index}_2$ is the value from the integral image of the second index (Doppler_End, Range_Start−1) of the neighborhood; $\text{Index}_2$ is the value from the integral image of the third index (Doppler_Start−1, Range_End) of the neighborhood and $\text{Index}_4$ is the value from the integral image of the fourth index (Doppler_Start−1, Range_Start−1) of the neighborhood. It should be noted that the energy determination module 114 repeats this calculation for each set of indices, such that for a neighborhood that has been broken into multiple portions, the energy determination module 114 may calculate multiple energy sums (one for each portion), which are added together to arrive at the energy sum for the neighborhood. In one example, with reference to FIG. 8, $\text{Index}_1$ is labeled 810, $\text{Index}_2$ is labeled 814, $\text{Index}_3$ is labeled 812 and $\text{Index}_4$ is labeled 816.

With reference to FIGS. 4, 4A, 5 and 5A, for the portion 216, based on the window data 136 of first index 228 (doppler 18, range 14) and the third index 226 (doppler 3, range 14), the energy determination module 114 retrieves the corresponding values from the integral image in FIGS. 5 and 5A. In FIGS. 5 and 5A, for the portion 216 of the neighborhood 212 of FIGS. 4 and 4A, $\text{Index}_1$ is labeled 520 and has a value of 1406. $\text{Index}_3$ is labeled 522 and has a value of 227. The energy sum for this portion 216 (FIGS. 4 and 4A) is 1179.

For the portion 214 of the neighborhood 212, based on the window data 136 of the first index 231 (doppler 18, range 43); the second index 232 (doppler 18, range 42); the third index 233 (doppler 3, range 43); and the fourth index 235 (doppler 3, range 42), the energy determination module 114 retrieves the corresponding values from the integral image in FIGS. 5 and 5A. In FIGS. 5 and 5A, for the portion 214 of the neighborhood 212 of FIGS. 4 and 4A, $\text{Index}_1$ is labeled 524 and has a value of 4329. $\text{Index}_2$ is labeled 525 and has a value of 4228. $\text{Index}_3$ is labeled 526 and has a value of 746. $\text{Index}_4$ is labeled 527 and has a value of 724 The energy sum for this portion 214 (FIGS. 4 and 4A) is 79. The energy sum for the neighborhood 212 is 1258 (the sum of the energy sum of portions 214, 216).

With reference to FIGS. 4B and 5B, based on the window data 136 of the first index 260 (doppler 18, range 22); the second index 258 (doppler 18, range 7); the third index 256 (doppler 3, range 22); and the fourth index 254 (doppler 3, range 7), the energy determination module 114 retrieves the corresponding values from the integral image in FIG. 5B. In FIG. 5B, for the neighborhood 252 of FIG. 4B, $\text{Index}_1$ is labeled 530 and has a value of 20169. $\text{Index}_2$ is labeled 532 and has a value of 6662. $\text{Index}_3$ is labeled 534 and has a value of 3051. $\text{Index}_4$ is labeled 536 and has a value of 881. The energy sum for the neighborhood 252 is 11337.

The energy determination module 114 receives as input the guard data 138. Based on the coordinate locations (doppler, range) of the cells contained in the guard data 138, the energy determination module 114 retrieves from the integral image 124 the values of the cells in the integral image at the associated coordinate location (doppler, range). Stated another way, for each of the indices in the guard data 138, the energy determination module 114 retrieves the value of the cell in the integral image at the coordinate location (doppler, range) that matches the coordinate location (doppler, range) of the cell of the respective guard index. The energy determination module 114 calculates the energy of the guard based on the following equation:

$$GE = \text{GIndex}_1 - \text{GIndex}_2 - \text{GIndex}_3 + \text{GIndex}_4 \quad (11)$$

Wherein GE is the guard energy sum; $\text{GIndex}_1$ is the value from the integral image of the first guard index (Doppler_End Guard, Range_End Guard) of the guard; $\text{GIndex}_2$ is the value from the integral image of the second guard index (Doppler_End Guard, Range_Start Guard−1) of the guard; $\text{GIndex}_3$ is the value from the integral image of the third guard index (Doppler_Start Guard−1, Range_End Guard) of the guard and $\text{GIndex}_4$ is the value from the integral image of the fourth guard index (Doppler_Start Guard−1, Range_Start Guard−1) of the guard. It should be noted that the energy determination module 114 repeats this calculation for each set of guard indices, such that for a guard that has been broken into multiple portions, the energy determination module 114 may calculate multiple energy sums (one for each guard portion), which are added together to arrive at the energy sum for the guard. In one example, with reference to FIG. 8, $GIndex_1$ is labeled 820, $GIndex_b$ is labeled 824, $GIndex_d$ is labeled 822 and $GIndex_a$ is labeled 826. As shown, a cell under test 830 is surrounded by the guard indices and the neighborhood indices.

With reference to FIGS. 4, 4A, 5 and 5A, based on the guard data 138 of the first guard index 246 (doppler 14, range 10); second guard index 244 (doppler 14, range 3); the third guard index 242 (doppler 7, range 10); and fourth guard index 240 (doppler 7, range 3), the energy determination module 114 retrieves the corresponding values from the integral image in FIGS. 5 and 5A. For the guard 236, in FIGS. 5 and 5A, $GIndex_1$ is labeled 550 and has a value of 772. $GIndex_2$ is labeled 552 and has a value of 260. $GIndex_3$ is labeled 554 and has a value of 364. $GIndex_4$ is labeled 556 and has a value of 128. The energy sum for the guard 236 is 276.

With reference to FIGS. 4B and 5B, based on the guard data 138 of the first guard index 272 (doppler 14, range 18); the second guard index 270 (doppler 14, range 11); the third guard index 268 (doppler 7, range 18); the fourth guard index 266 (doppler 7, range 11), the energy determination module 114 retrieves the corresponding values from the integral image in FIGS. 5 and 5A. For the guard 264, in FIGS. 5 and 5A, $GIndex_1$ is labeled 560 and has a value of 13038. $GIndex_2$ is labeled 562 and has a value of 8004. $GIndex_3$ is labeled 564 and has a value of 6184. $GIndex_4$ is labeled 566 and has a value of 3712. The energy sum for the guard 264 is 2562.

The energy determination module 114 subtracts the energy of the guard (determined in equation (11)) from the energy of the window (determined in equation (10)) to determine a total energy sum. The energy determination module 114 subtracts the number of cells in the neighborhood (from the neighborhood threshold 132) from the number of cells in the guard (from the guard threshold 134). The energy determination module 114 divides the energy sum by the difference between the number of cells in the neighborhood and the number of cells in the guard to arrive at an estimated noise for the cell under test 126.

For FIGS. 4 and 4A, the total energy sum is 982, and the difference between the number of cells in the neighborhood 212 (196; the neighborhood threshold 132 doubled multiplied by the neighborhood threshold 132 doubled) and the number of cells in the guard 236 (36; the guard threshold 134 doubled multiplied by the guard threshold 134 doubled) is 160. The estimated noise for the cell under test 210 is 6.14 (982 divided by 160). For FIG. 4B, the total energy sum is 8775, and the difference between the number of cells in the neighborhood 252 (196; the neighborhood threshold 132 doubled multiplied by the neighborhood threshold 132 doubled) and the number of cells in the guard 236 (36; the guard threshold 134 doubled multiplied by the guard threshold 134 doubled) is 160. The estimated noise for the cell under test 250 is 54.84 (8775 divided by 160).

The energy determination module 114 queries the threshold datastore 108 and retrieves the noise threshold 135. The energy determination module 114 retrieves the energy value of the cell under test 126 from the initial image 120. The energy determination module 114 multiplies the estimated noise for the cell under test 126 by the noise threshold 135, and compares the energy value of the cell under test 126 from the initial image 120 to the product of the estimated noise and the noise threshold 135. If the energy value of the cell under test 126 from the initial image 120 is greater than the product of the estimated noise and the noise threshold 135, the energy determination module 114 qualifies the cell under test 126 as a detection and associates the qualification 128 of detection with the cell under test 126. The energy determination module 114 stores the qualification 128 associated with the cell under test 126 in the detection datastore 106. If the energy value of the cell under test 126 from the initial image 120 is less than or equal to the product of the estimated noise for the cell under test 126 and the noise threshold 135, the energy determination module 114 qualifies the cell under test 126 as noise and associates the qualification 128 of noise with the cell under test 126. The energy determination module 114 stores the qualification 128 associated with the cell under test 126 in the detection datastore 106.

For the cell under test 210 (FIGS. 4 and 4A), the energy value from the initial image is 3. The product of the estimated noise and the noise threshold 135 (6.14×25) is 153.5, which is greater than 3. Thus, the energy determination module 114 qualifies the cell under test 210 as noise and associates the qualification 128 of noise with the cell under test 210. For the cell under test 250 (FIG. 4B), the energy value from the initial image is 38. The product of the estimated noise and the noise threshold 135 (54.84×25) is 1371, which is greater than 38. Thus, the energy determination module 114 qualifies the cell under test 250 as noise and associates the qualification 128 of noise with the cell under test 250.

The neighborhood determination module 112 repeats the determination of the window data 136 and the guard data 138 for each cell under test 126, and the energy determination module 114 repeats the qualifying of each cell under test 126 until each cell under test 126 in the detection datastore 106 has an associated qualification 128.

Referring now to FIGS. 9-13, and with continued reference to FIGS. 1-3, flowcharts illustrate a method 900 that can be performed by the classification and detection system 100 of FIG. 1 in accordance with the present disclosure. In one example, the method 900 is performed by the processor 44 of the controller 34. As can be appreciated in light of the disclosure, the order of operation within the method is not limited to the sequential execution as illustrated in FIGS. 9-13, but may be performed in one or more varying orders as applicable and in accordance with the present disclosure. In various embodiments, the method 900 can be scheduled to run based on one or more predetermined events, and/or may run continuously during operation of the autonomous vehicle 10.

Figure 9:
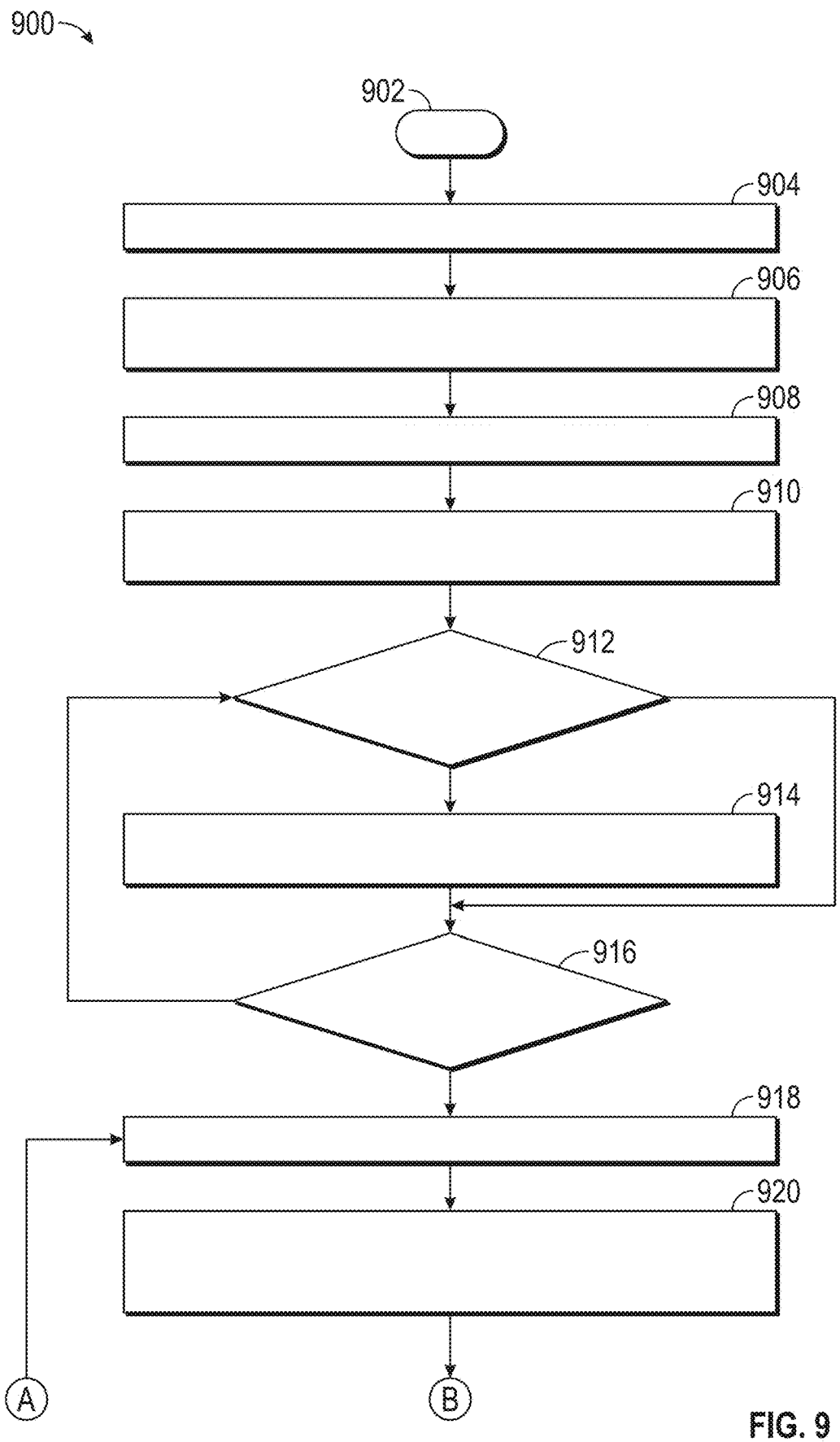
FIGS. 9-13A are flowcharts illustrating a method that can be performed by the classification and detection system in accordance with various embodiments.

With reference to FIG. 9, the method begins at 902. At 904, the method receives the radar energy map (based on the received signals 118 from the receiving antennas 45 from the transceiver module 41 of the radar system 40a) from another control module associated with the controller 34. At 906, the method removes the dedicated zone 608 (FIG. 6) from the radar energy map to generate the initial image 700 (FIG. 7). At 908, the method queries the integral image datastore 102 and retrieves the integral image data structure 116. The method computes the integral image based on the energy values in the initial image and equation (1) using the integral image data structure 116. At 910, the method queries the threshold datastore 108 and retrieves the energy threshold 130. For each cell in the initial image, the method compares the energy value of the cell in the initial image to the energy threshold 130. At 912, optionally, the method determines whether the energy value in the cell is greater than the energy threshold 130. If true, the method, at 914, optionally, identifies the cell as a possible detection, and stores the cell in the detection datastore 106. From 914, the method proceeds to 916.

Otherwise, if false at 912, the method proceeds to 916. At 916, the method determines whether the energy values of all of the cells in the initial image have been compared to the energy threshold 130. If true, the method proceeds to 918. If false, the method loops to 912. If the initial thresholding (blocks 910-916) is not performed, the method treats each cell as a cell under test and proceeds 918.

Figure 9A:
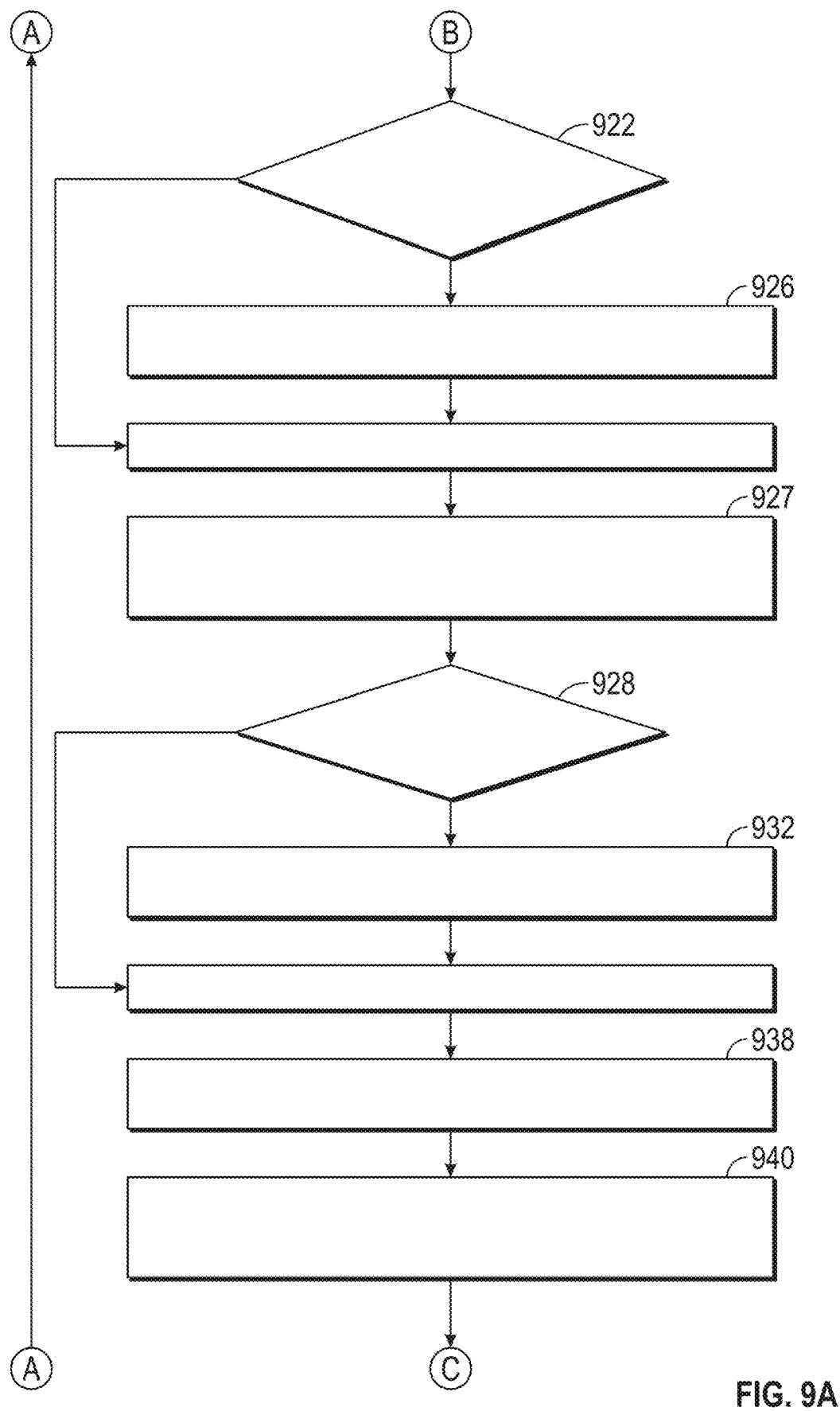

At 918, the method receives a first one of the cell(s) under test 126 from the detection datastore 106. At 920, the method queries the threshold datastore 108 and retrieves the neighborhood threshold 132. The method constructs, based on the coordinate location (doppler, range) of the cell under test 126 and the neighborhood threshold 132, the neighborhood around the cell under test 126. With reference to FIG. 9A, at 922, the method determines whether the neighborhood needs to wrap around the initial image to provide the number of cells needed to define the neighborhood. If false, at 924, the method proceeds to FIG. 10. Otherwise, if true, at 926, the method breaks the neighborhood into additional, smaller rectangle(s), square(s) or portion(s) to reach the number of cells that match or correspond with the neighborhood threshold 132. At 924, the method proceeds to FIG. 10 to determine the neighborhood energy sum.

Figure 10:
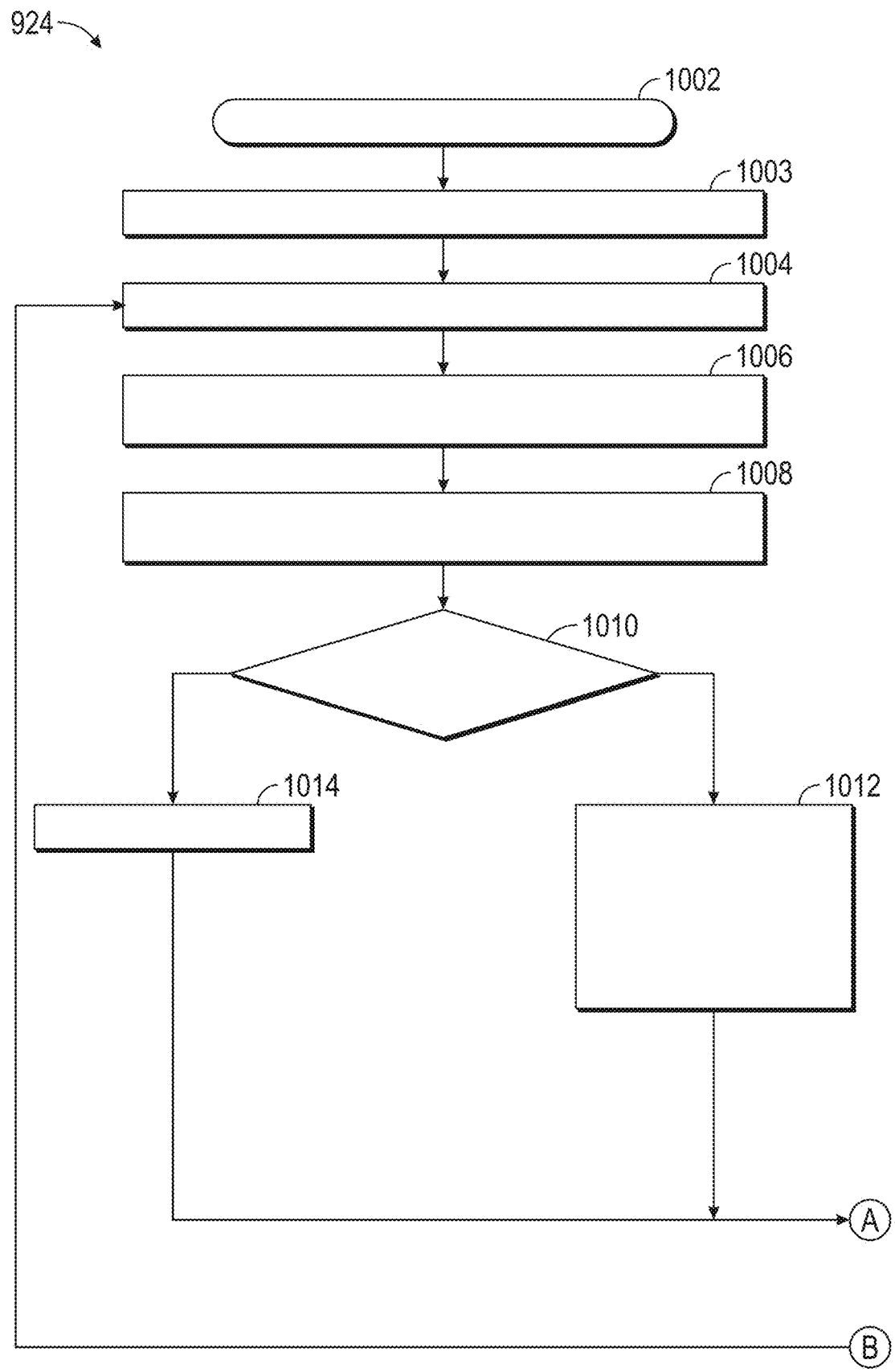
Figure 10A:
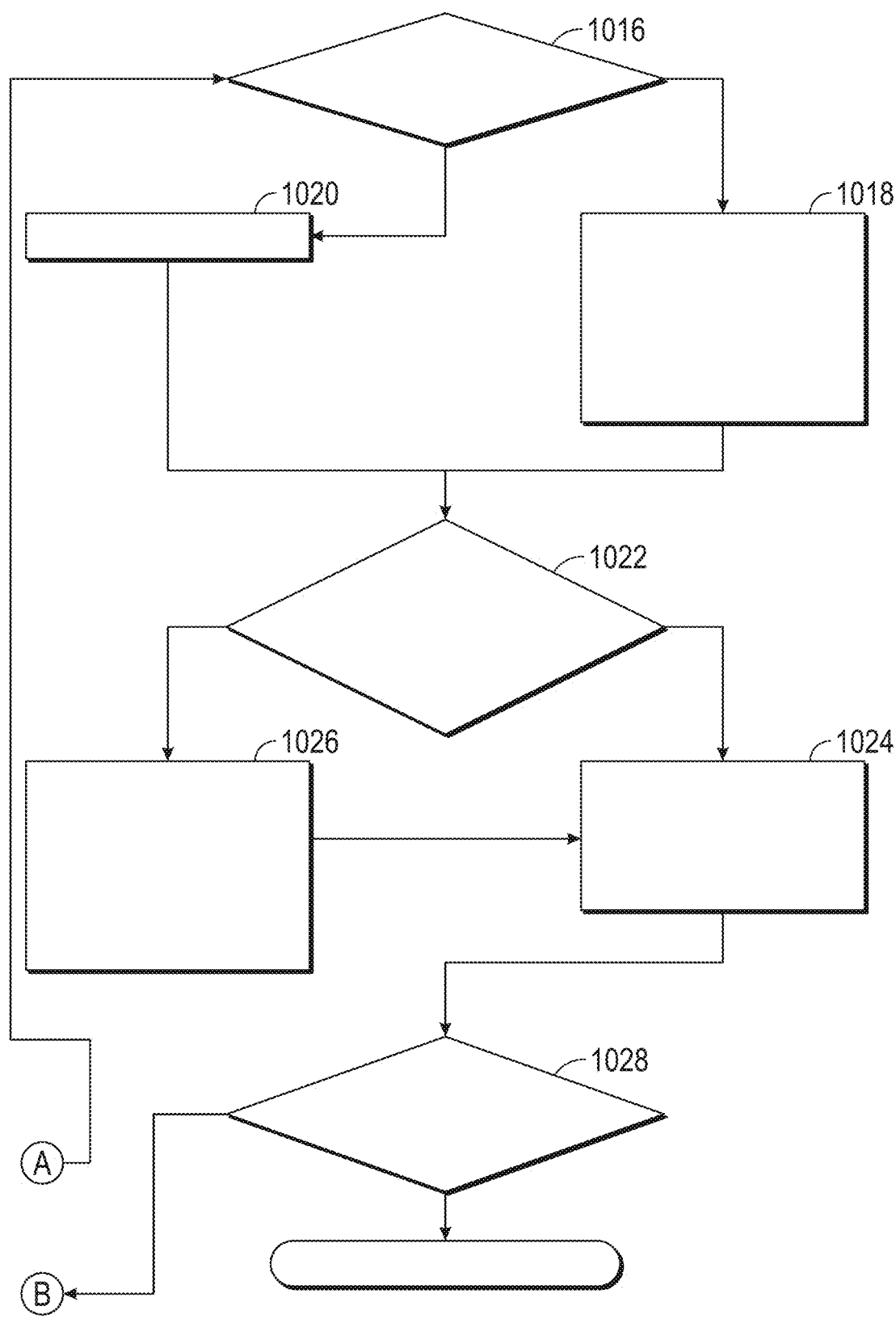

With reference to FIGS. 10-10A, the method begins at 1002. At 1003, the method sets the neighborhood energy sum equal to zero. At 1004, the method sets the energy sum for the portion equal to zero and the diagonal equal to true for the portion. At 1006, the method determines the Range_Start value, the Range_End value, the Doppler_Start value and the Doppler_End value for the portion. Stated another way, if the neighborhood is not broken or wrapped around the initial image, the method determines the Range_Start value, the Range_End value, the Doppler_Start value and the Doppler_End value with the entirety of the neighborhood as the portion and determines the Range_Start value, the Range_End value, the Doppler_Start value and the Doppler_End value for the neighborhood at 1006. If the neighborhood is broken into portions or wrapped around the initial image, the method determines the Range_Start value, the Range_End value, the Doppler_Start value and the Doppler_End value for a first one of the portions at 1006. In one example, with reference to FIGS. 12-12A, the method starts at 1202 to determine the Range_Start value, the Range_End value, the Doppler_Start value and the Doppler_End value for the portion. At 1204, the method sets END as equal to the sum of the range of the cell under test (RangeCUT) and the neighborhood threshold 132. At 1206, the method determines if END is greater than the range limit threshold 139. If true, the method proceeds to 1208. Otherwise, at 1210, the method sets Range_End as equal to END, which is the sum of the range of the cell under test and the neighborhood threshold 132 (Range_End=Range$_{CUT}$+Threshold$_W$).

At 1208, the method sets Range_End the range limit threshold 139 minus END or the range limit threshold 139 minus the sum of the range of the cell under test and the neighborhood threshold 132 (Range_End=Range Limit Threshold-(Range$_{CUT}$+Threshold$_W$)). At 1212, the method sets START to the range of the cell under test minus the neighborhood threshold 132. At 1214, the method determines whether START is less than one. If true, the method proceeds to 1216. Otherwise, at 1218, the method sets Range_Start as equal to START, which is the range of the cell under test minus the neighborhood threshold 132 (Range_Start=Range$_{CUT}$-Threshold$_W$).

At 1216, the method sets Range_Start as equal to the sum of the range limit threshold and START, or the sum of the range limit threshold and the range of the cell under test minus the neighborhood threshold 132 (Range_Start=Range Limit Threshold+(Range$_{CUT}$-Threshold$_W$)). At 1220, the method sets END as equal to the sum of the doppler of the cell under test (DopplerCUT) and the neighborhood threshold 132. With reference to FIG. 12A, at 1222, the method determines if END is greater than the doppler limit threshold 137. If true, the method proceeds to 1224. Otherwise, at 1226, the method sets Doppler_End as equal to END, which is the sum of the doppler of the cell under test and the neighborhood threshold 132 (Doppler_End=Doppler$_{CUT}$+Threshold$_W$).

At 1224, the method sets Doppler_End the doppler limit threshold 137 minus END or the doppler limit threshold 137 minus the sum of the doppler of the cell under test and the neighborhood threshold 132 (Doppler_End=Doppler Limit Threshold-(Doppler$_{CUT}$+Threshold$_W$)). At 1228, the method sets START to the doppler of the cell under test minus the neighborhood threshold 132. At 1230, the method determines whether START is less than one. If true, the method proceeds to 1232. Otherwise, at 1234, the method sets Doppler_Start as equal to START, which is the doppler of the cell under test minus the neighborhood threshold 132 (Doppler_Start=Doppler$_{CUT}$-Threshold$_W$). At 1232, the method sets Doppler_Start as equal to the doppler limit threshold 137 plus START, or the sum of the doppler limit threshold 137 and the doppler of the cell under test minus the neighborhood threshold 132 (Doppler_Start=Doppler Limit Threshold+(Doppler$_{CUT}$-Threshold$_W$)). With the Range_Start, Range_End, Doppler_Start and Doppler_End determined for the portion, the method sets or stores the Range_Start, Range_End, Doppler_Start and Doppler_End for the portion at 1236. At 1238, the method determines whether all portions have been evaluated. If true, the method returns to 1008 on FIG. 10. Otherwise, the method loops to 1204.

Figure 12:
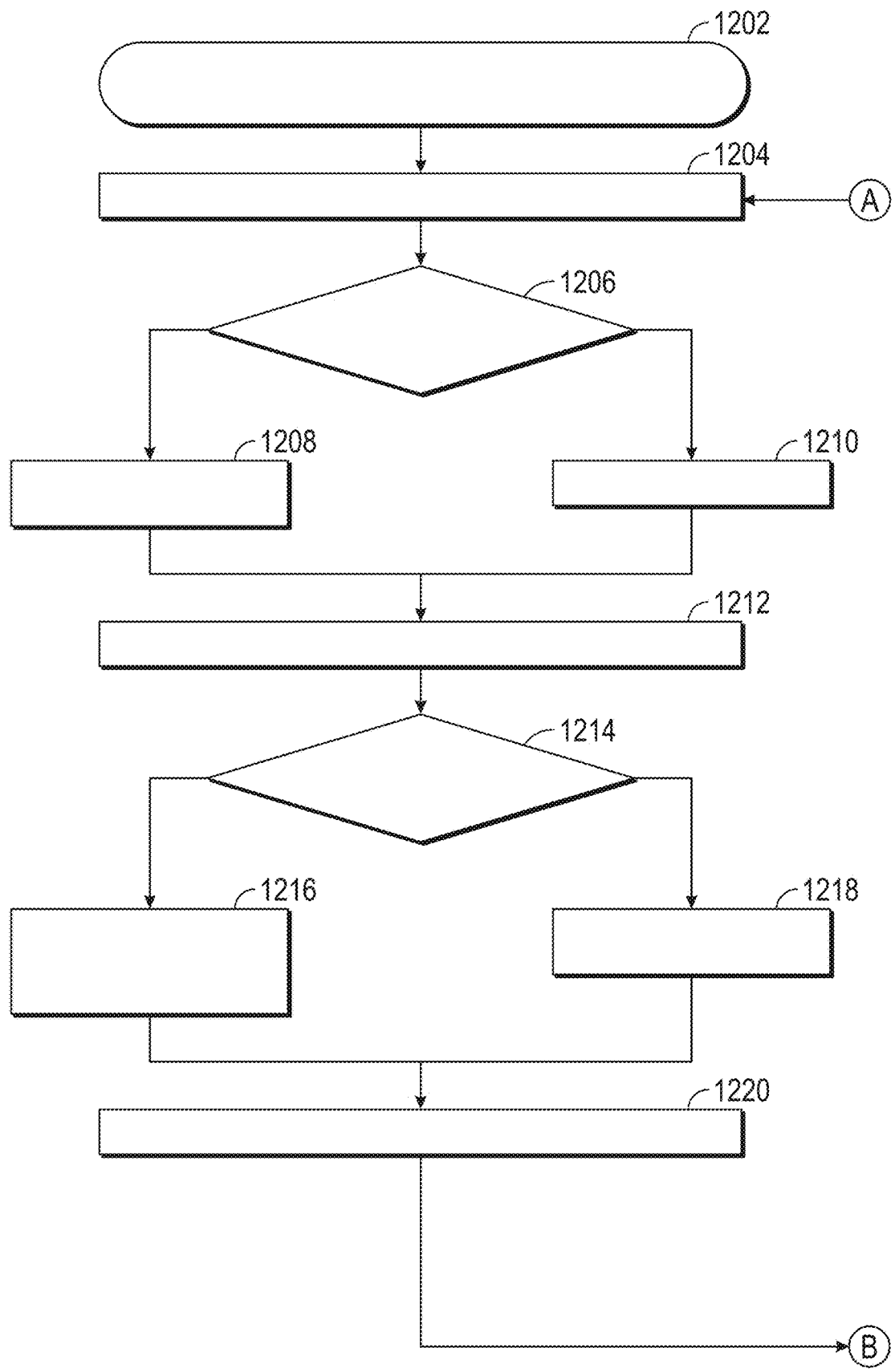
Figure 12A:
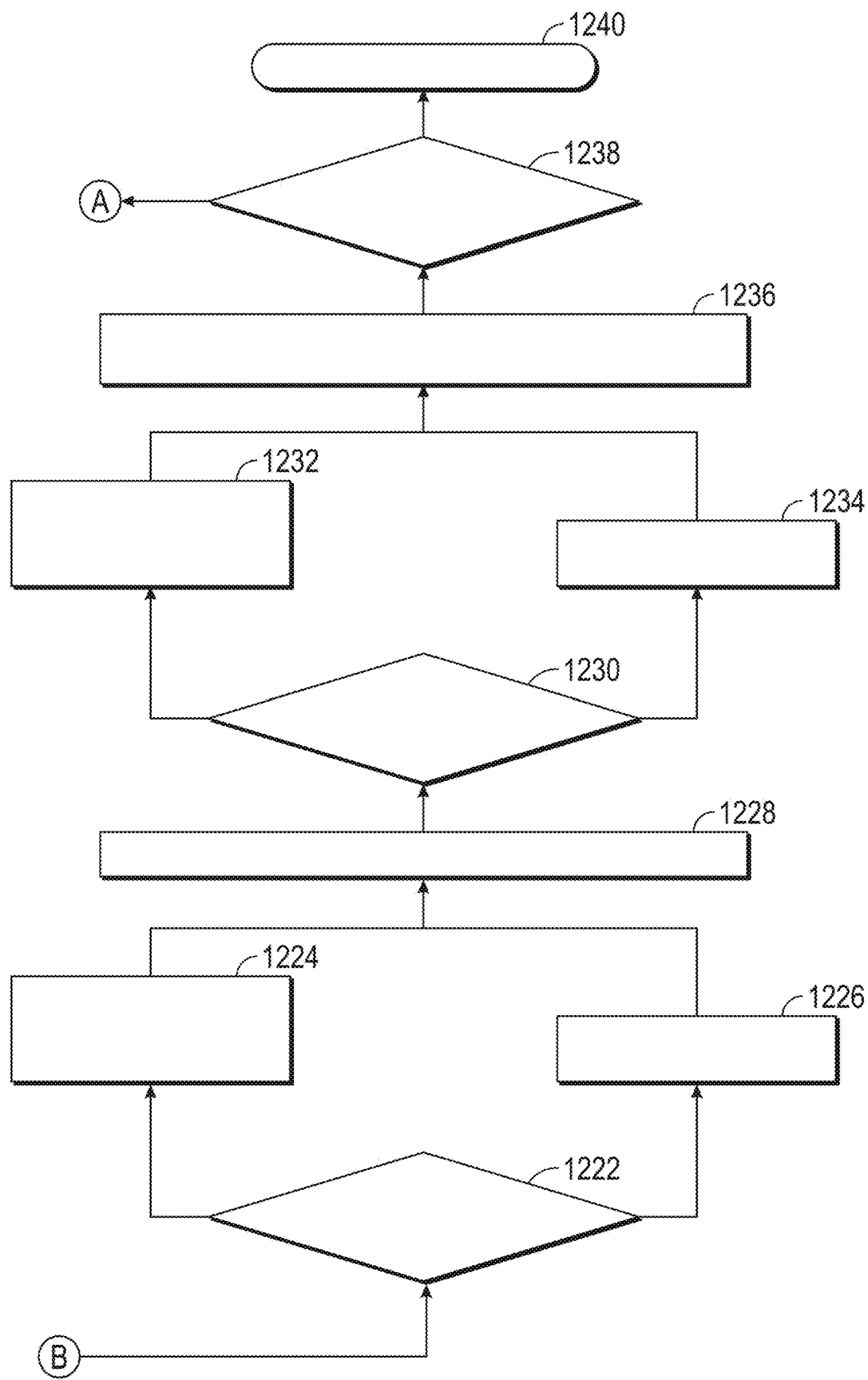

With reference back to FIG. 10, with the Range_Start, Range_End, Doppler_Start and Doppler_End determined for each portion based on 1202-1238 discussed with regard to FIGS. 12-12A, at 1008, the method retrieves the value from the integral image for the first index (Doppler_End, Range_End) and sets this value as the energy sum for the portion. At 1010, the method determines whether Range_Start minus one is greater than zero. If true, the method proceeds to 1012. If false, the method proceeds to 1014 and sets the diagonal to false before proceeding to 1016. At 1012, the method retrieves the value from the integral image for the second index (Doppler_End, Range_Start-1) and subtracts this value from the energy sum for the portion.

With reference to FIG. 10A, at 1016, the method determines whether Doppler_Start minus one is greater than zero. If true, at 1018, the method retrieves the value from the integral image for the third index (Doppler_Start-1, Range_End) and subtracts this value from the energy sum for the portion. Otherwise, if false, at 1020, the method sets the diagonal to false.

At 1022, the method determines whether the diagonal is true, the Range_Start minus one is greater than zero and the Doppler_Start minus one is greater than zero. If false, the method proceeds to 1024. Otherwise, if true, at 1026, the method retrieves the value from the integral image for the fourth index (Doppler_Start-1, Range_Start-1) and adds this value from the energy sum for the portion. At 1024, the method adds the energy sum for the portion to the neighborhood energy sum. At 1028, the method determines whether all of the portions of the neighborhood have been evaluated, based on the neighborhood constructed in FIG. 9. If true, the method proceeds to 927 on FIG. 9A. Otherwise, the method loops to 1004 and determines the energy sum for the next portion of the neighborhood.

With reference back to FIG. 9A, at 927, the method queries the threshold datastore 108 and retrieves the guard threshold 134. The method constructs, based on the coordinate location (doppler, range) of the cell under test 126 and the guard threshold 134, the guard around the cell under test 126. At 928, the method determines whether the guard needs to wrap around the initial image to provide the number of cells needed to define the guard. If false, at 930, the method proceeds to FIGS. 11-11A. Otherwise, if true, at 932, the method breaks the guard into additional, smaller rectangle(s), square(s) or portion(s) to reach the number of cells that match or correspond with the guard threshold 134. At 930, the method proceeds to FIGS. 11-11A to determine the guard energy sum.

Figure 11:
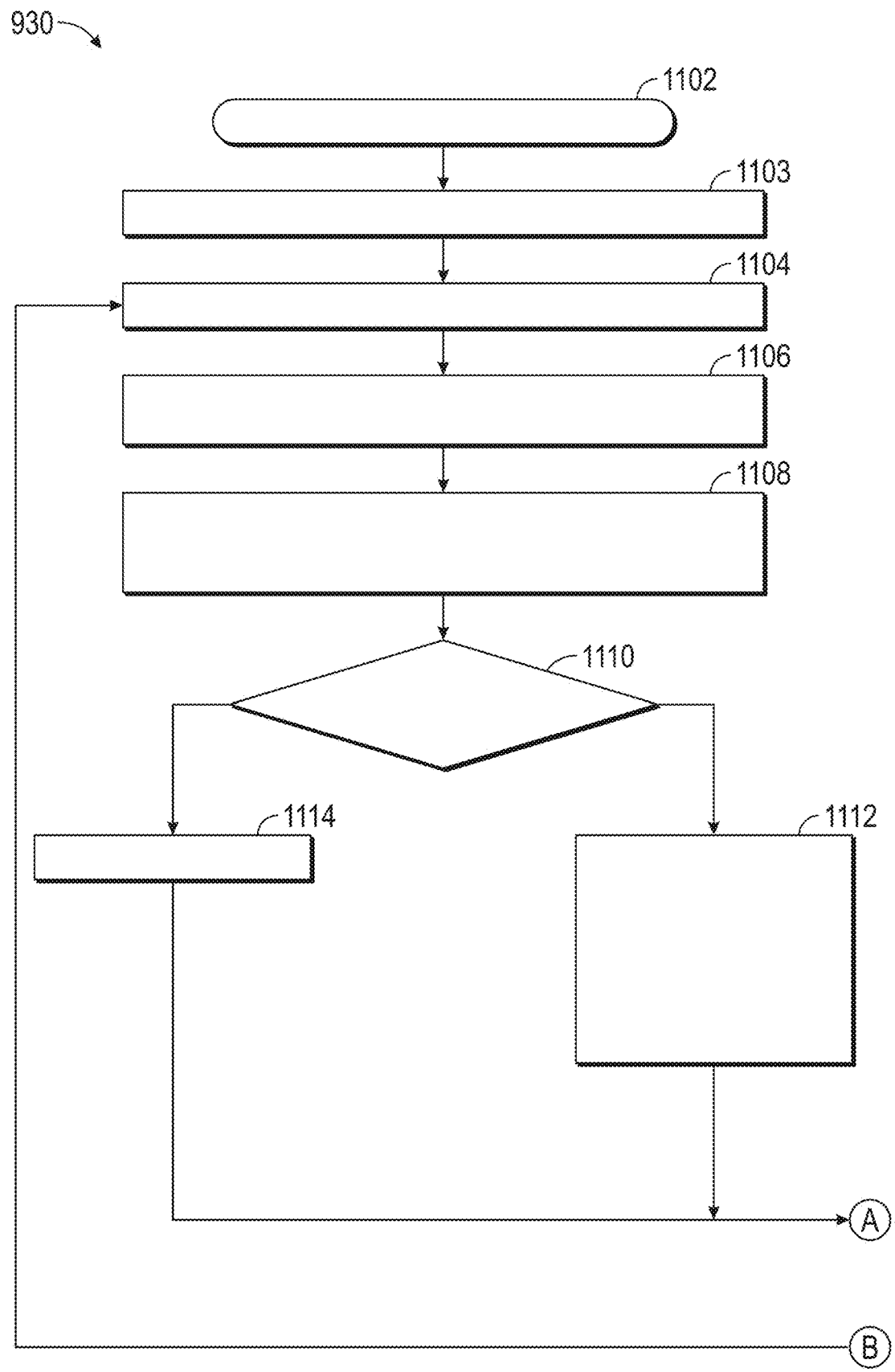

With reference to FIG. 11, the method begins at 1102. At 1103, the method sets the guard energy sum equal to zero. At 1104, the method sets the energy sum equal to zero and the diagonal equal to true for the portion. At 1106, the method determines the Range_Start Guard value, the Range_End Guard value, the Doppler_Start Guard value and the Doppler_End Guard value for the portion. Stated another way, if the guard is not broken or wrapped around the initial image, the method determines the Range_Start Guard value, the Range_End Guard value, the Doppler_Start Guard value and the Doppler_End Guard value with the entirety of the guard as the portion and determines the Range_Start Guard value, the Range_End Guard value, the Doppler_Start Guard value and the Doppler_End Guard value for the guard at 1106. If the guard is broken into portions or wrapped around the initial image, the method determines the Range_Start Guard value, the Range_End Guard value, the Doppler_Start Guard value and the Doppler_End Guard value for a first one of the portions at 1106. In one example, with reference to FIGS. 13-13A, the method starts at 1302 to determine the Range_Start Guard value, the Range_End Guard value, the Doppler_Start Guard value and the Doppler_End Guard value for the portion. At 1304, the method sets END as equal to the sum of the range of the cell under test (RangeCUT) and the guard threshold 134. At 1306, the method determines if END is greater than the range limit threshold 139. If true, the method proceeds to 1308. Otherwise, at 1310, the method sets Range_End Guard as equal to END, which is the sum of the range of the cell under test and the guard threshold 134 (Range_End Guard=$Range_{CUT}$+$Threshold_G$).

At 1308, the method sets Range_End Guard as the range limit threshold 139 minus END or the range limit threshold 139 minus the sum of the range of the cell under test and the guard threshold 134 (Range_End Guard=Range Limit Threshold−($Range_{CUT}$+$Threshold_G$)). At 1312, the method sets START to the range of the cell under test minus the guard threshold 134. At 1314, the method determines whether START is less than one. If true, the method proceeds to 1316. Otherwise, at 1318, the method sets Range_Start Guard as equal to START, which is the range of the cell under test minus the guard threshold 134 (Range_Start Guard=$Range_{CUT}$−$Threshold_G$).

At 1316, the method sets Range_Start Guard as equal to the sum of the range limit threshold and START, or the sum of the range limit threshold and the range of the cell under test minus the guard threshold 134 (Range_Start Guard=Range Limit Threshold+($Range_{CUT}$−$Threshold_G$)).

At 1320, the method sets END as equal to the sum of the doppler of the cell under test ($Doppler_{CUT}$) and the guard threshold 134. With reference to FIG. 13A, at 1322, the method determines if END is greater than the doppler limit threshold 137. If true, the method proceeds to 1324. Otherwise, at 1326, the method sets Doppler_End Guard as equal to END, which is the sum of the doppler of the cell under test and the guard threshold 134 (Doppler_End Guard=$Doppler_{CUT}$+$Threshold_G$).

At 1324, the method sets Doppler_End Guard the doppler limit threshold 137 minus END or the doppler limit threshold 137 minus the sum of the doppler of the cell under test and the guard threshold 134 (Doppler_End Guard=Doppler Limit Threshold−($Doppler_{CUT}$+$Threshold_G$)). At 1328, the method sets START to the doppler of the cell under test minus the guard threshold 134. At 1330, the method determines whether START is less than one. If true, the method proceeds to 1332. Otherwise, at 1334, the method sets Doppler_Start Guard as equal to START, which is the doppler of the cell under test minus the guard threshold 134 (Doppler_Start Guard=$Doppler_{CUT}$−$Threshold_G$). At 1332, the method sets Doppler_Start Guard as equal to the doppler limit threshold 137 plus START, or the sum of the doppler limit threshold 137 and the doppler of the cell under test minus the guard threshold 134 (Doppler_Start Guard=Doppler Limit Threshold+($Doppler_{CUT}$−$Threshold_G$)). With the Range_Start Guard, Range_End Guard, Doppler_Start Guard and Doppler_End Guard determined for the portion, the method sets or stores the Range_Start Guard, Range_End Guard, Doppler_Start Guard and Doppler_End Guard for the portion at 1336. At 1338, the method determines whether all portions have been evaluated. If true, the method returns to 1108 on FIG. 11. Otherwise, the method loops to 1304.

Figure 13:
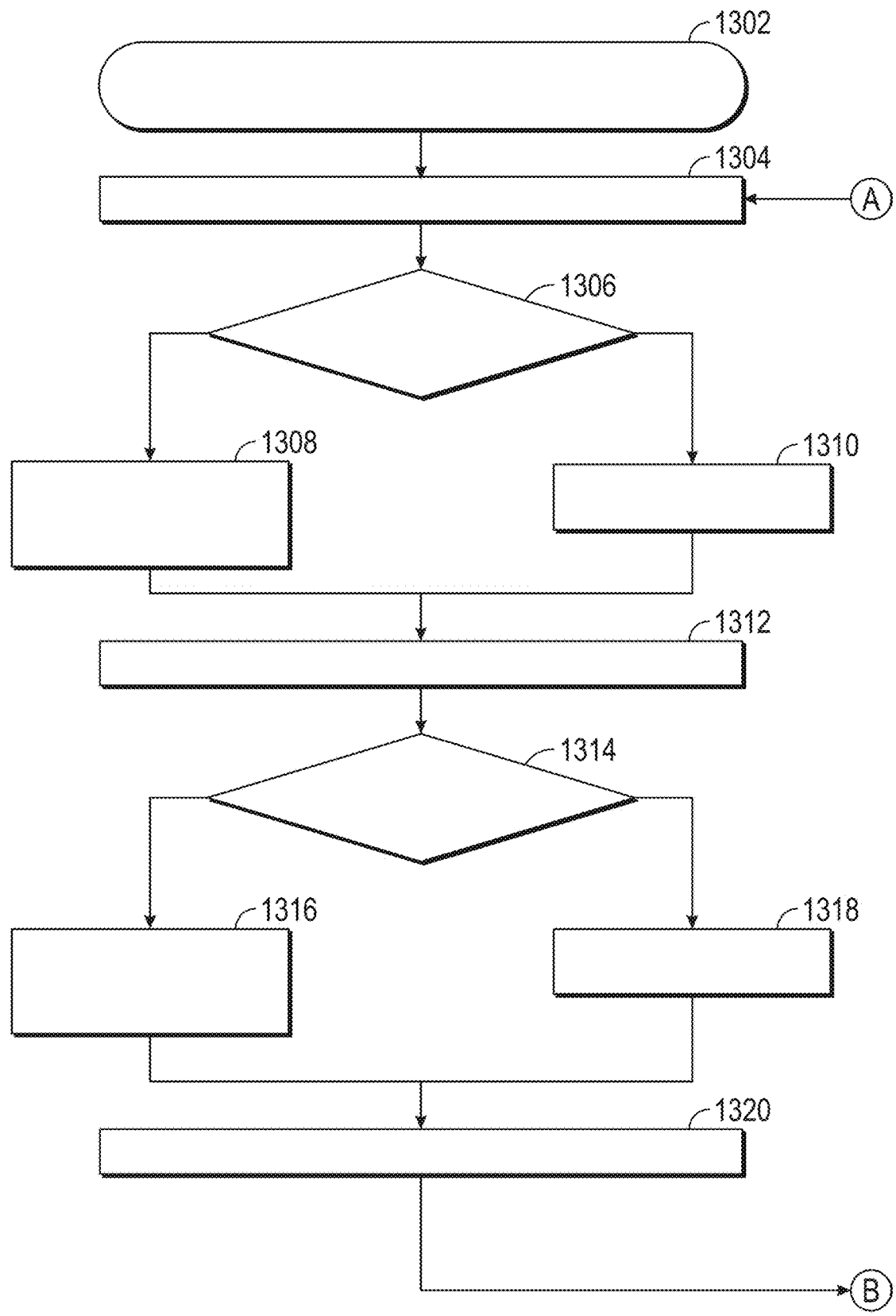
Figure 13A:
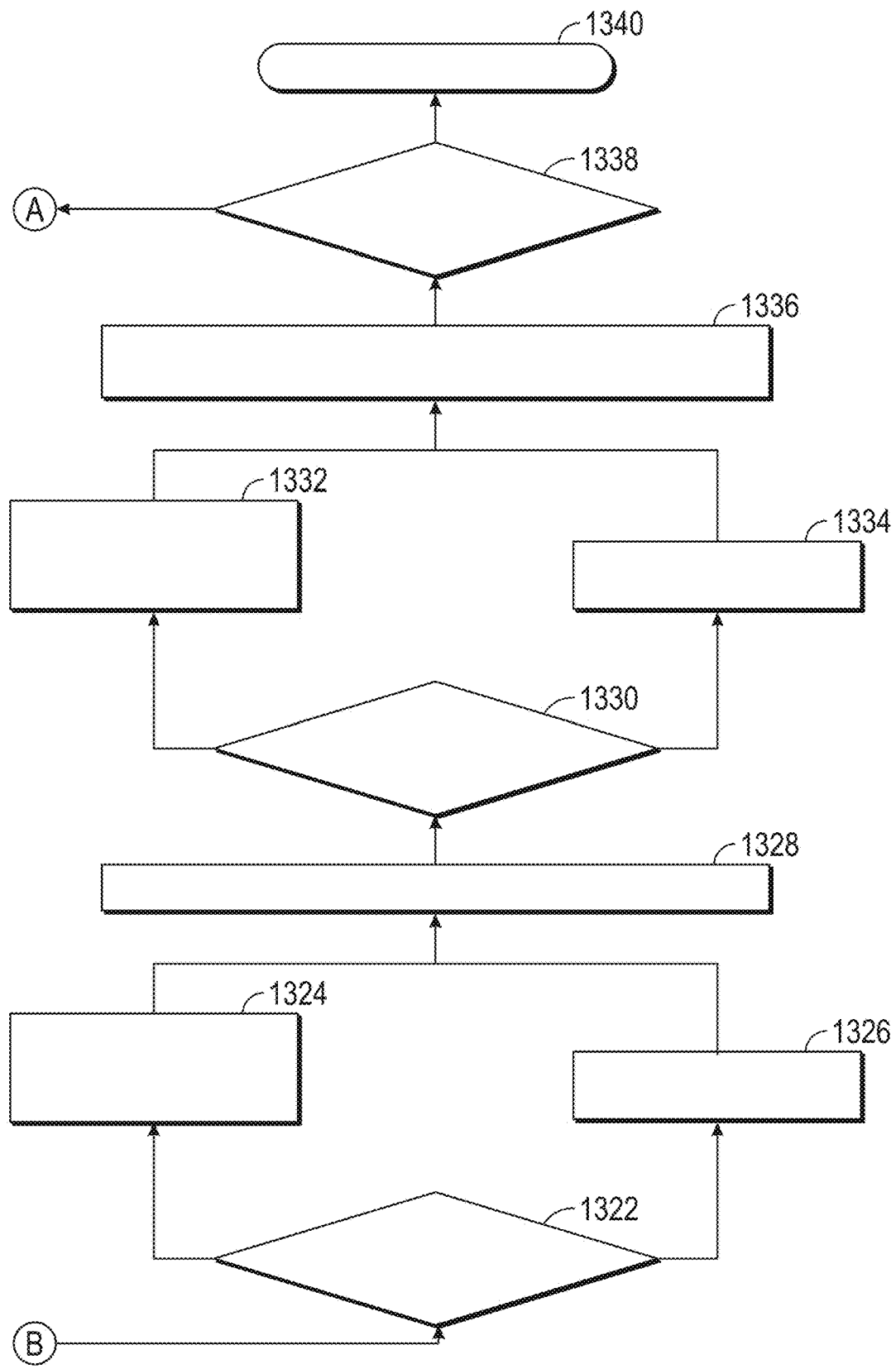

With reference back to FIG. 11, with the Range_Start Guard, Range_End Guard, Doppler_Start Guard and Doppler_End Guard determined for each portion based on 1302-1338 discussed with regard to FIGS. 13-13A, at 1108, the method retrieves the value from the integral image for the first index (Doppler_End Guard, Range_End Guard) and sets this value as the guard energy sum for the portion. At 1110, the method determines whether Range_Start Guard minus one is greater than zero. If true, the method proceeds to 1112. If false, the method proceeds to 1114 and sets the diagonal to false before proceeding to 1116. At 1112, the method retrieves the value from the integral image for the second index (Doppler_End Guard, Range_Start Guard−1) and subtracts this value from the guard energy sum for the portion.

Figure 11A:
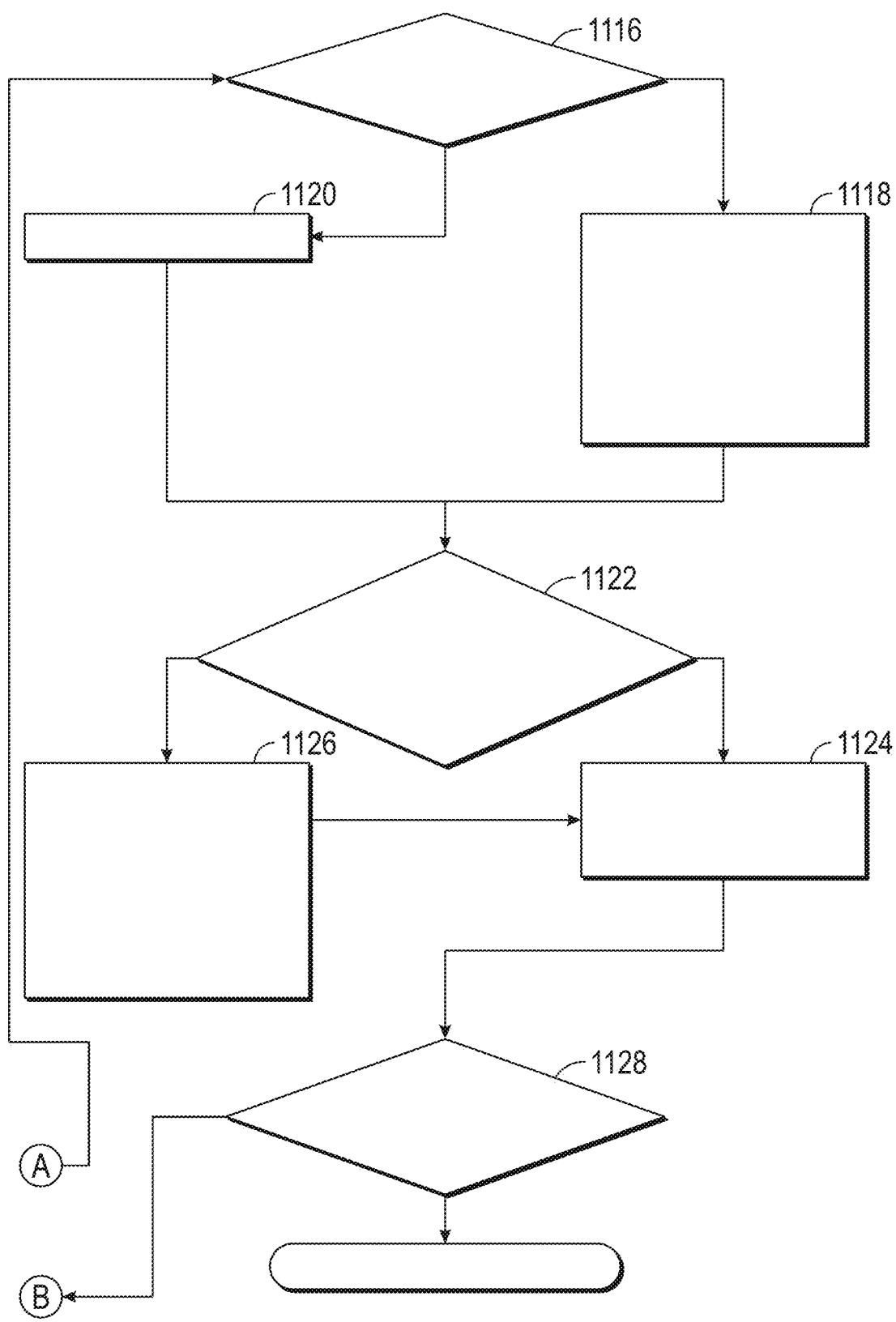

With reference to FIG. 11A, at 1116, the method determines whether Doppler_Start Guard minus one is greater than zero. If true, at 1118, the method retrieves the value from the integral image for the third index (Doppler_Start Guard−1, Range_End Guard) and subtracts this value from the guard energy sum for the portion. Otherwise, if false, at 1120, the method sets the diagonal to false.

At 1122, the method determines whether the diagonal is true, the Range_Start Guard minus one is greater than zero and the Doppler_Start Guard minus one is greater than zero. If false, the method proceeds to 1124. Otherwise, if true, at 1126, the method retrieves the value from the integral image for the fourth index (Doppler_Start Guard−1, Range_Start Guard−1) and adds this value from the guard energy sum for the portion. At 1124, the method adds the guard energy sum for the portion to the guard energy sum. At 1128, the method determines whether all of the portions of the guard have been evaluated, based on the guard constructed in FIG. 9A.

If true, the method proceeds to 938 on FIG. 9A. Otherwise, the method loops to 1104 and determines the energy sum for the next portion of the guard.

Figure 9B:
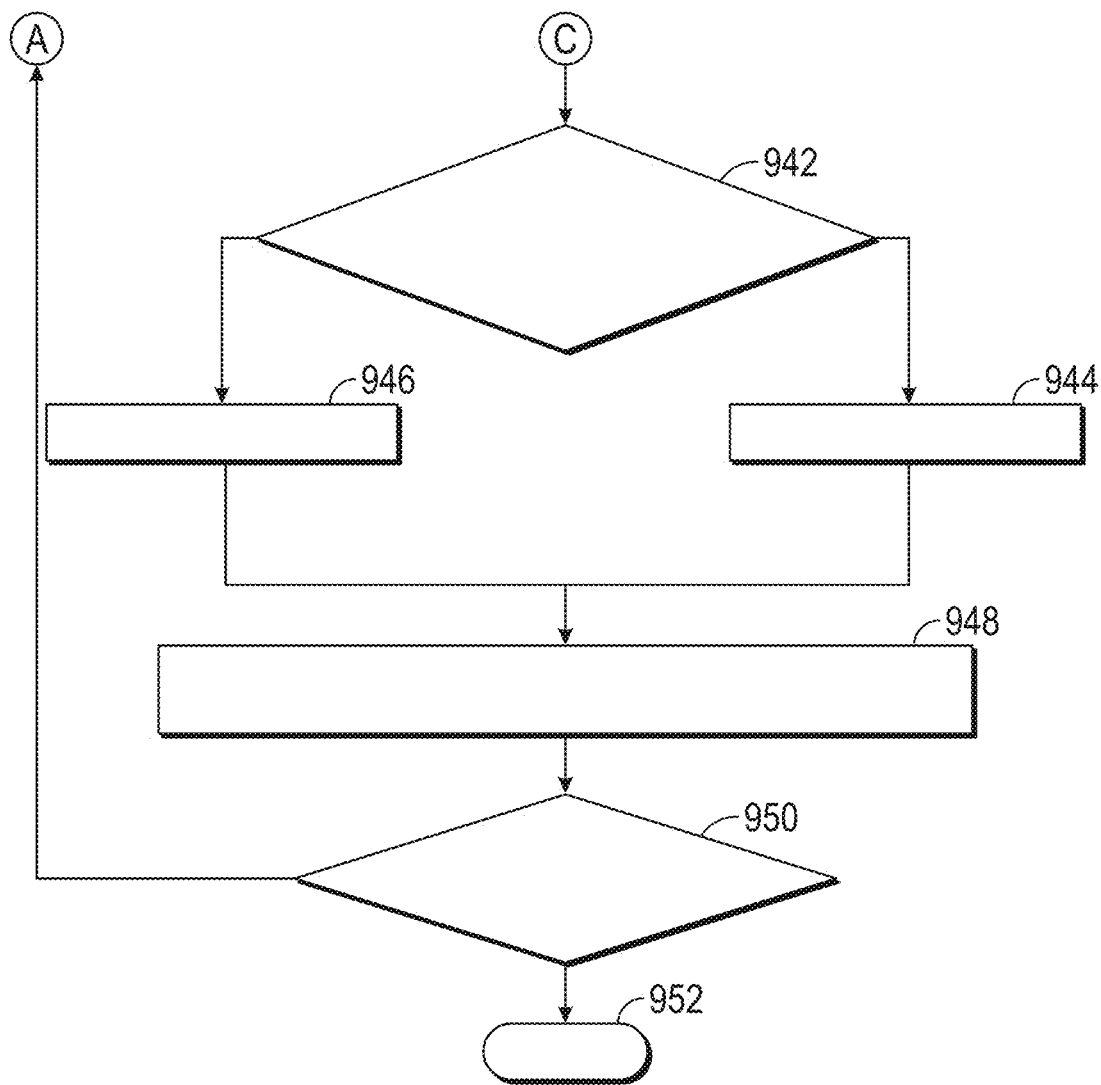

With reference to FIG. 9A, at 938, the method subtracts the energy of the guard from the energy of the neighborhood to compute the total energy sum. At 940, the method subtracts the number of cells in the guard from the number of cells in the neighborhood to arrive at a number of cells. The method divides the total energy sum by the number of cells (the number of cells in the window minus the number of cells in the guard) to compute the estimated noise for the cell under test 126. With reference to FIG. 9B, at 942, the method queries the threshold datastore 108 and retrieves the noise threshold 135. The method retrieves the energy value of the cell under test 126 from the initial image 120. The method multiplies the estimated noise for the cell under test 126 by the noise threshold 135, and compares the energy value of the cell under test 126 from the initial image 120 to the product of the estimated noise for the cell under test 126 and the noise threshold 135. The method determines whether the energy value of the cell under test 126 from the initial image 120 is greater than the product of the estimated noise and the noise threshold 135. If true, the method proceeds to 944 and qualifies the cell under test 126 as a detection. If false, the method proceeds to 946 and qualifies the cell under test 126 as noise.

At 948, the method associates the qualification (noise or detection) with the cell under test, and stores this association in the detection datastore 106. At 950, the method determines whether all of the cells in the detection datastore 106 have been qualified or have an association (noise or detection). If true, the method ends at 952. Otherwise, if false, the method proceeds to 918. Thus, the classification and detection system 100 enables the qualification of cells under test with a significantly reduced number of scalar operations, which reduces processing time for the controller 34 and also reduces missed detections. Moreover, by qualifying the cell under test in two dimensions (doppler and range), accuracy of the detections is improved.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for classifying received signals from a radar system into noise or a detection, comprising:
    a source of a radar energy map that contains the received signals;
    a memory that stores an integral image data structure for computing an integral image having a plurality of cells with a coordinate location;
    a processor in communication with the source and the memory, the processor programmed to:
        generate an initial image including a plurality of initial cells each having an energy value and a coordinate location based on the radar energy map;
        compute the integral image based on the initial image, with each cell of the plurality of cells of the integral image containing a value computed based on the energy values of associated cells of the plurality of initial cells of the initial image, and store the computed integral image in the integral image data structure;
        determine, based on the initial image, a coordinate location of an initial cell of the plurality of initial cells;
        determine coordinate locations of indices associated with corners of a neighborhood surrounding the initial cell based on the coordinate location of the initial cell and a neighborhood threshold for the number of initial cells associated with the neighborhood;
        determine an energy sum of the neighborhood based on the coordinate locations of the indices and the value of respective cells of the plurality of cells from the integral image associated with the coordinate locations of the indices;
        determine an estimated noise associated with the initial cell based on the energy sum; and
        determine, based on the estimated noise and the energy value of the initial cell from the initial image, whether the initial cell indicates the detection of an object.

2. The system of claim 1, wherein the processor is further programmed to determine whether to wrap the neighborhood around the initial image based on the coordinate location of the initial cell and the neighborhood threshold.

3. The system of claim 2, wherein based on the determination to wrap the neighborhood around the initial image, the processor is further programmed to break the neighborhood into additional portions to reach the neighborhood threshold for the number of initial cells associated with the neighborhood and to determine the indices of the neighborhood based on indices associated with corners of each portion.

4. The system of claim 1, wherein the processor is further programmed to construct a guard surrounding the initial cell within the neighborhood based on the coordinate location of the initial cell in the initial image and a guard threshold for a number of initial cells associated with the guard, and to determine guard indices based on the guard.

5. The system of claim 4, wherein the processor is further programmed to determine whether to wrap the guard around the initial image based on the coordinate location of the initial cell and the guard threshold for the number of initial cells associated with the guard.

6. The system of claim 5, wherein based on the determination to wrap the guard around the initial image, the processor is further programmed to break the guard into additional guard portions to reach the guard threshold for the number of initial cells associated with the guard and to determine the guard indices based on guard indices associated with corners of each guard portion.

7. The system of claim 4, wherein the processor is programmed to determine a guard energy sum of the guard based on the coordinate locations of the guard indices and the value of respective cells of the plurality of cells from the integral image associated with the coordinate locations of the guard indices.

8. The system of claim 7, wherein the processor is further programmed to determine a total energy sum associated with the initial cell based on the energy sum and the guard energy sum, and the processor is programmed to determine the estimated noise based on the total energy sum.

9. A method for classifying received signals from a radar system into noise or a detection, comprising:
providing a memory that stores an integral image data structure for computing an integral image having a plurality of cells;
receiving, by a processor, a radar energy map that contains the received signals from a source;
generating, by the processor, an initial image having a plurality of initial cells that each contain an energy value and a coordinate location based on the radar energy map;
computing, by the processor, the integral image based on the initial image, with each cell of the plurality of cells of the integral image containing a value computed based on the energy values of associated cells of the plurality of initial cells of the initial image, and storing the computed integral image in the integral image data structure;
determining, by the processor, based on the initial image, a coordinate location of an initial cell of the plurality of initial cells that has the energy value that is greater than a threshold;
determining, by the processor, coordinate locations of indices associated with corners of a neighborhood surrounding the initial cell based on the coordinate location of the initial cell and a neighborhood threshold for the number of initial cells associated with the neighborhood;
determining, by the processor, an energy sum of the neighborhood based on the coordinate locations of the indices and the value of the respective cells of the plurality of cells from the integral image associated with the coordinate locations of the indices;
determining, by the processor, an estimated noise associated with the initial cell based on the energy sum; and
determining, by the processor, based on the estimated noise and the energy value of the initial cell from the initial image, whether the initial cell indicates the detection of an object.

10. The method of claim 9, further comprising:
determining, by the processor, to wrap the neighborhood around the initial image based on the coordinate location of the initial cell and the neighborhood threshold;
breaking, by the processor, the neighborhood into additional portions to reach the neighborhood threshold for the number of initial cells associated with the neighborhood; and
determining, by the processor, the indices of the neighborhood based on the indices associated with corners of each portion.

11. The method of claim 9, further comprising:
constructing, by the processor, a guard surrounding the initial cell within the neighborhood based on the coordinate location of the initial cell in the initial image and a guard threshold for a number of initial cells associated with the guard; and
determining, by the processor, guard indices based on the guard, the guard indices associated with corners of the guard.

12. The method of claim 11, further comprising:
determining, by the processor, to wrap the guard around the initial image based on the coordinate location of the initial cell and the guard threshold for the number of initial cells associated with the guard;
breaking, by the processor, the guard into additional guard portions to reach the threshold for the number of initial cells associated with the guard; and
determining, by the processor, the guard indices based on the indices associated with corners of each guard portion.

13. The method of claim 12, further comprising:
determining, by the processor, a guard energy sum of the guard based on the coordinate locations of the guard indices and the value of respective cells of the plurality of cells from the integral image associated with the coordinate locations of the guard indices.

14. The method of claim 13, further comprising:
determining, by the processor, a total energy sum associated with the initial cell based on the energy sum and the guard energy sum; and
determining, by the processor, the estimated noise based on the total energy sum.

15. A vehicle, comprising:
a source of a radar energy map;
a memory that stores an integral image data structure for computing an integral image having a plurality of cells;
a processor in communication with the source and the memory, the processor programmed to:
generate an initial image including a plurality of initial cells each having an energy value and a coordinate location based on the radar energy map;
compute the integral image based on the initial image, with each cell of the plurality of cells of the integral image containing a value computed based on the energy values of associated cells of the plurality of initial cells of the initial image, and store the computed integral image in the integral image data structure;
determine, based on the initial image, a coordinate location of an initial cell of the plurality of initial cells that has the energy value that is greater than a threshold;
determine coordinate locations of indices associated with corners of a neighborhood surrounding the initial cell based on the coordinate location of the initial cell and a neighborhood threshold for the number of initial cells associated with the neighborhood;
determine an energy sum of the neighborhood based on the coordinate locations of the indices and the value of respective cells of the plurality of cells from the integral image associated with the coordinate locations of the indices;
determine coordinate locations of guard indices associated with corners of a guard surrounding the initial cell based on the coordinate location of the initial cell and a guard threshold for the number of initial cells associated with the guard;
determine a guard energy sum of the guard based on the coordinate locations of the guard indices and the value of respective cells of the plurality of cells from the integral image associated with the coordinate locations of the guard indices;
determine an estimated noise associated with the initial cell based on the energy sum and the guard energy sum; and
determine, based on the estimated noise and the energy value of the initial cell from the initial image, whether the initial cell indicates the detection of an object.

16. The vehicle of claim 15, wherein the processor is further programmed to determine whether to wrap the neighborhood around the initial image based on the coordinate location of the initial cell and the neighborhood threshold.

17. The vehicle of claim 16, wherein based on the determination to wrap the neighborhood around the initial image, the processor is further programmed to break the neighborhood into additional portions to reach the neighborhood threshold for the number of initial cells associated with the neighborhood and to determine the indices of the neighborhood based on indices associated with corners of each portion.

18. The vehicle of claim 15, wherein the processor is further programmed to determine whether to wrap the guard around the initial image based on the coordinate location of the initial cell and the guard threshold for the number of initial cells associated with the guard.

19. The vehicle of claim 18, wherein based on the determination to wrap the guard around the initial image, the processor is further programmed to break the guard into additional guard portions to reach the guard threshold for the number of initial cells associated with the guard and to determine the guard indices based on guard indices associated with corners of each guard portion.

20. The vehicle of claim 15, wherein the processor is further programmed to control the vehicle based on the detection of the object.

\* \* \* \* \*